United States Patent
Lindholm et al.

(10) Patent No.: US 7,002,588 B1
(45) Date of Patent: Feb. 21, 2006

(54) SYSTEM, METHOD AND COMPUTER PROGRAM PRODUCT FOR BRANCHING DURING PROGRAMMABLE VERTEX PROCESSING

(75) Inventors: John Erik Lindholm, Saratoga, CA (US); Simon S. Moy, Los Altos, CA (US); Robert Steven Glanville, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/391,930

(22) Filed: Mar. 19, 2003

Related U.S. Application Data

(63) Continuation-in-part of application No. 09/960,630, filed on Sep. 20, 2001, now Pat. No. 6,844,880, which is a continuation-in-part of application No. 09/586,249, filed on May 31, 2000, which is a continuation-in-part of application No. 09/456,102, filed on Dec. 6, 1999, now Pat. No. 6,353,439.

(51) Int. Cl.
G09G 5/37 (2006.01)
G09G 5/36 (2006.01)
G06T 1/60 (2006.01)
(52) U.S. Cl. .................... 345/561; 345/530; 345/559
(58) Field of Classification Search ............ 345/561, 345/530, 559; 712/1, 2, 4, 7
See application file for complete search history.

(56) References Cited

U.S. PATENT DOCUMENTS

| | | | |
|---|---|---|---|
| 4,996,666 A | 2/1991 | Duluk, Jr. ................ 365/49 |
| 5,025,407 A | 6/1991 | Gulley et al. ............ 364/754 |
| 5,222,202 A | 6/1993 | Koyamada ............... 395/123 |
| 5,459,820 A | 10/1995 | Schroeder et al. ......... 395/120 |
| 5,535,288 A | 7/1996 | Chen et al. ................ 382/236 |
| 5,572,634 A | 11/1996 | Duluk, Jr. ................ 395/119 |
| 5,574,835 A | 11/1996 | Duluk, Jr. et al. ......... 395/121 |
| 5,596,686 A | 1/1997 | Duluk, Jr. ................ 395/122 |
| 5,669,010 A | 9/1997 | Duluk, Jr. ............ 395/800.22 |
| 5,694,143 A | 12/1997 | Fielder et al. ............. 345/112 |
| 5,724,561 A | 3/1998 | Tarolli et al. ............. 395/523 |
| 5,764,241 A * | 6/1998 | Elliott et al. ............. 345/473 |
| 5,798,762 A | 8/1998 | Sfarti et al. ............... 345/420 |
| 5,798,770 A | 8/1998 | Baldwin .................. 345/506 |
| 5,801,711 A | 9/1998 | Koss et al. ................ 345/441 |
| 5,838,337 A | 11/1998 | Kimura et al. ............ 345/519 |
| 5,886,701 A | 3/1999 | Chauvin et al. ........... 345/418 |
| 5,956,042 A | 9/1999 | Tucker et al. ............. 345/426 |
| 5,966,532 A | 10/1999 | McDonald et al. ........ 395/701 |

(Continued)

FOREIGN PATENT DOCUMENTS

EP   0690430 A2   1/1996

(Continued)

OTHER PUBLICATIONS

Borgenstam, U.; Svensson, J. Shaders. Chalmers University of Technology. http://www.ce.chalmers.se/old/undergraduate/D/EDA425/lectures/shaders.pdf.*

(Continued)

*Primary Examiner*—Kee M. Tung
*Assistant Examiner*—Joni Hsu
(74) *Attorney, Agent, or Firm*—Zilka-Kotab, PC

(57) ABSTRACT

A system, method and computer program product are provided for branching during graphics processing. Initially, a first operation is performed on data. In response to the first operation, a branching operation is performed to a second operation. The first operation and the second operation are associated with instructions selected from a predetermined instruction set.

21 Claims, 9 Drawing Sheets

U.S. PATENT DOCUMENTS

| | | | |
|---|---|---|---|
| 5,977,987 A | 11/1999 | Duluk, Jr. | 345/441 |
| 5,977,997 A | 11/1999 | Vainsencher | 345/519 |
| 6,000,027 A | 12/1999 | Pawate et al. | 712/39 |
| 6,014,144 A | 1/2000 | Nelson et al. | 345/426 |
| 6,046,747 A | 4/2000 | Saunders et al. | 345/430 |
| 6,057,855 A | 5/2000 | Barkans | 345/435 |
| 6,097,395 A | 8/2000 | Harris et al. | 345/426 |
| 6,137,497 A | 10/2000 | Strunk et al. | 345/434 |
| 6,144,365 A | 11/2000 | Young et al. | 345/153 |
| 6,163,319 A | 12/2000 | Peercy et al. | 345/426 |
| 6,215,504 B1 * | 4/2001 | Longhenry et al. | 345/443 |
| 6,219,071 B1 | 4/2001 | Krech, Jr. et al. | 345/503 |
| 6,229,553 B1 | 5/2001 | Duluk, Jr. et al. | 345/506 |
| 6,242,343 B1 | 6/2001 | Yamazaki et al. | 438/633 |
| 6,252,608 B1 * | 6/2001 | Snyder et al. | 345/473 |
| 6,268,875 B1 | 7/2001 | Duluk, Jr. et al. | 345/506 |
| 6,285,378 B1 | 9/2001 | Duluk, Jr. | 345/441 |
| 6,288,730 B1 | 9/2001 | Duluk, Jr. et al. | 345/552 |
| 6,295,599 B1 * | 9/2001 | Hansen et al. | 712/32 |
| 6,304,265 B1 | 10/2001 | Harris et al. | 345/421 |
| 6,351,760 B1 * | 2/2002 | Shankar et al. | 708/654 |
| 6,421,808 B1 * | 7/2002 | McGeer et al. | 716/1 |
| 2002/0030685 A1 * | 3/2002 | Brethour | 345/503 |

FOREIGN PATENT DOCUMENTS

| | | |
|---|---|---|
| EP | 0690430 A3 | 7/1996 |
| WO | 93/23816 | 11/1993 |
| WO | 97/05575 | 2/1997 |
| WO | 97/05576 | 2/1997 |
| WO | 98/28695 | 7/1998 |
| WO | 99/52040 | 10/1999 |
| WO | 00/10372 | 3/2000 |
| WO | 00/11562 | 3/2000 |
| WO | 00/11602 | 3/2000 |
| WO | 00/11603 | 3/2000 |
| WO | 00/11604 | 3/2000 |
| WO | 00/11605 | 3/2000 |
| WO | 00/11607 | 3/2000 |
| WO | 00/11613 | 3/2000 |
| WO | 00/11614 | 3/2000 |
| WO | 00/19377 | 4/2000 |

OTHER PUBLICATIONS

Traditional Vertex Lighting Instructions. http://www.directx.com/shader/vertex/instructions.htm.*

"Condition testing." London South Bank University. http://www.scism.sbu.ac.uk/law/Section5/chap6/s5c6p 11.html.*

Marc Olano and Trey Greer; "Triangle Scan Conversion Using 2D Homogeneous Coordinates"; 1997, SIGGRAPH/Eurographics Workshop.

Office Action mailed Dec. 1, 2004 in U.S. Appl. No. 10/180,798, which was Filed Jun. 25, 2002.

U.S. Appl. No. 10/188,697 which was filed Jul. 1, 2002.

U.S. Appl. No. 10/108,798 which was filed Jun. 25, 2002.

* cited by examiner

SYSTEM, METHOD AND COMPUTER PROGRAM PRODUCT FOR BRANCHING DURING PROGRAMMABLE VERTEX PROCESSING

RELATED APPLICATION(S)

The present application is a continuation-in-part of a patent application entitled "SYSTEM, METHOD AND COMPUTER PROGRAM PRODUCT FOR AN IMPROVED PROGRAMMABLE VERTEX PROCESSING MODEL WITH INSTRUCTION SET" filed Sep. 20, 2001 under Ser. No. 09/960,630, now U.S. Pat. No. 6,844,880, which is, in turn, a continuation-in-part of an application entitled "SYSTEM, METHOD AND ARTICLE OF MANUFACTURE FOR A PROGRAMMABLE VERTEX PROCESSING MODEL WITH INSTRUCTION SET" filed May 31, 2000 under Ser. No. 09/586,249 which is, in turn, a continuation-in-part of an application entitled "METHOD, APPARATUS AND ARTICLE OF MANUFACTURE FOR A TRANSFORM MODULE IN A GRAPHICS PROCESSOR" filed Dec. 6, 1999 under Ser. No. 09/456,102, now issued under U.S. Pat. No.: 6,353,439, which are each incorporated herein by reference in their entirety for all purposes.

FIELD OF THE INVENTION

The present invention relates to computer graphics, and more particularly to providing programmability in a computer graphics processing pipeline.

BACKGROUND OF THE INVENTION

Graphics application program interfaces (API's) have been instrumental in allowing applications to be written to a standard interface and to be run on multiple platforms, i.e. operating systems. Examples of such graphics API's include Open Graphics Library (OpenGL®) and D3D™ transform and lighting pipelines. OpenGL® is the computer industry's standard graphics API for defining 2-D and 3-D graphic images. With OpenGL®, an application can create the same effects in any operating system using any OpenGL®-adhering graphics adapter. OpenGL® specifies a set of commands or immediately executed functions. Each command directs a drawing action or causes special effects.

Thus, in any computer system which supports this OpenGL® standard, the operating system(s) and application software programs can make calls according to the standard, without knowing exactly any specifics regarding the hardware configuration of the system. This is accomplished by providing a complete library of low-level graphics manipulation commands, which can be used to implement graphics operations.

A significant benefit is afforded by providing a predefined set of commands in graphics API's such as OpenGL®. By restricting the allowable operations, such commands can be highly optimized in the driver and hardware implementing the graphics API. On the other hand, one major drawback of this approach is that changes to the graphics API are difficult and slow to be implemented. It may take years for a new feature to be broadly adopted across multiple vendors.

With the impending integration of transform operations into high speed graphics chips and the higher integration levels allowed by semiconductor manufacturing, it is now possible to make part of the geometry pipeline accessible to the application writer. There is thus a need to exploit this trend in order to afford increased flexibility in visual effects. In particular, there is a need to provide a new computer graphics programming model and instruction set that allows convenient implementation of changes to the graphics API, while preserving the driver and hardware optimization afforded by currently established graphics API's.

DISCLOSURE OF THE INVENTION

A system, method and computer program product are provided for branching during graphics processing. Initially, a first operation is performed on data. In response to the first operation, a branching operation is performed to a second operation. The first operation and the second operation are associated with instructions selected from a predetermined instruction set.

In one embodiment, the branching to the second operation may be performed based on a condition. As an option, the branching to the second operation may be performed based on a Boolean condition. Further, the branching to the second operation may be performed if content of a predetermined register (i.e. a condition code register) is true. Still yet, the branching may be performed to labels.

In another embodiment, the branching to the second operation may be performed based on a comparison. For example, the branching to the second operation may be performed based on a comparison involving zero. Such comparison may include a greater than operation, a less than operation, a greater than or equal operation, a less than or equal operation, an equal operation, a not equal operation, etc.

Optionally, the branching operation may involve a swizzle operation. Further, the first operation and the second operation may be selected from the group consisting of a fraction operation, a no operation, a move operation, a multiply operation, an addition operation, a multiply and addition operation, a reciprocal operation, a reciprocal square root operation, a three component dot product operation, a four component dot product operation, a distance operation, a minimum operation, a maximum operation, an exponential operation, a logarithm operation, and a lighting operation.

DESCRIPTION OF THE PREFERRED EMBODIMENTS

Figure 1:
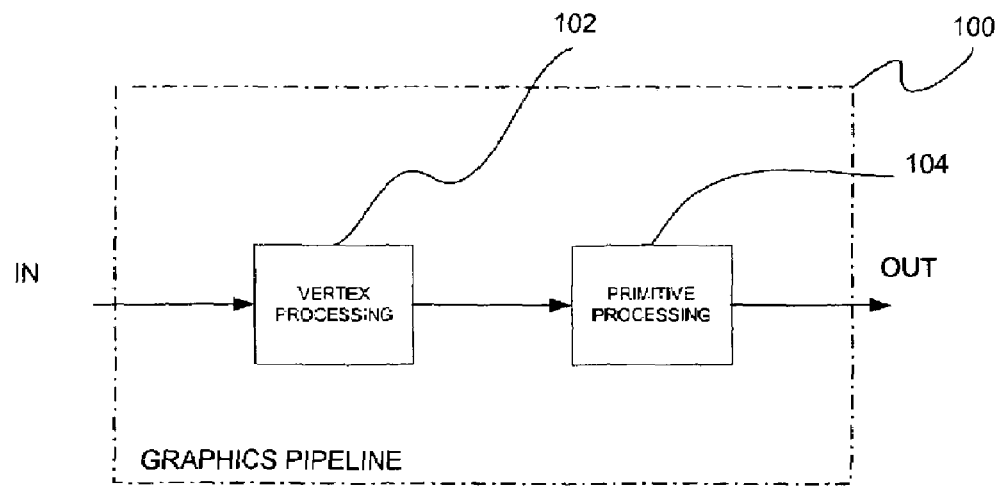
FIG. 1 is a conceptual diagram illustrating a graphics pipeline in accordance with one embodiment.

FIG. 1 is a conceptual diagram illustrating a graphics pipeline 100 in accordance with one embodiment. During use, the graphics pipeline 100 is adapted to carry out numerous operations for the purpose of processing computer graphics. Such operations may be categorized into two types, namely vertex processing 102 and primitive processing 104. At least partially during use, the vertex processing 102 and primitive processing 104 adhere to a standard graphics application program interface (API) such as OpenGL®, Microsoft® DirectX® (i.e. DX9™), or any other desired graphics API.

Vertex processing 102 normally leads primitive processing 104, and includes well known operations such as texgen operations, lighting operations, transform operations, and/or any other operations that involve vertices in the computer graphics pipeline 100.

Primitive processing 104 normally follows vertex processing 102, and includes well known operations such as culling, frustum clipping, polymode operations, flat shading, polygon offsetting, fragmenting, and/or any other operations that involve primitives in the computer graphics pipeline 100. It should be noted that still other operations may be performed such as viewport operations.

Figure 2:
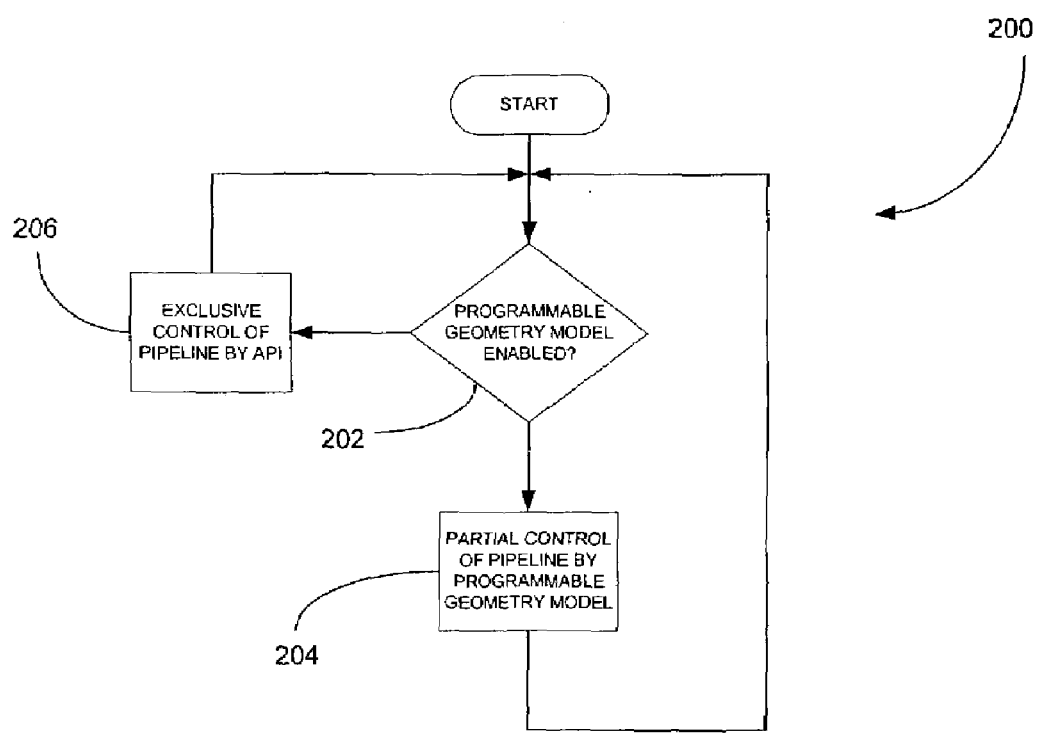
FIG. 2 illustrates the overall operation of the various components of the graphics pipeline of FIG. 1.

FIG. 2 illustrates a high level operation 200 of the graphics pipeline 100 of FIG. 1. As shown, it is constantly determined in decision 202 whether current operation invokes a programmable geometry model. If so, a mode is enabled that partially supercedes the vertex processing 102 of the standard graphics API, thus providing increased flexibility in generating visual effects. See operation 204.

When disabled, the present embodiment allows increased or exclusive control of the graphics pipeline 100 by the standard graphics API, as indicated in operation 206. In one optional embodiment, states of the standard graphics API may not be overruled by invoking the programmable geometry mode of the present embodiment. As another option, no standard graphics API state may be directly accessible by the present embodiment.

In one embodiment, the programmable geometry mode may optionally be limited to vertex processing from object space into homogeneous clip space. This is to avoid compromising hardware performance that is afforded by allowing exclusive control of the primitive processing 104 by the standard graphics API at all times.

The remaining description will be set forth assuming that the programmable geometry mode supersedes the standard graphics API only during vertex processing 102. It should be noted, however, that in various embodiments, the programmable geometry mode may also supersede the standard graphics API during primitive processing 104.

Figure 3:
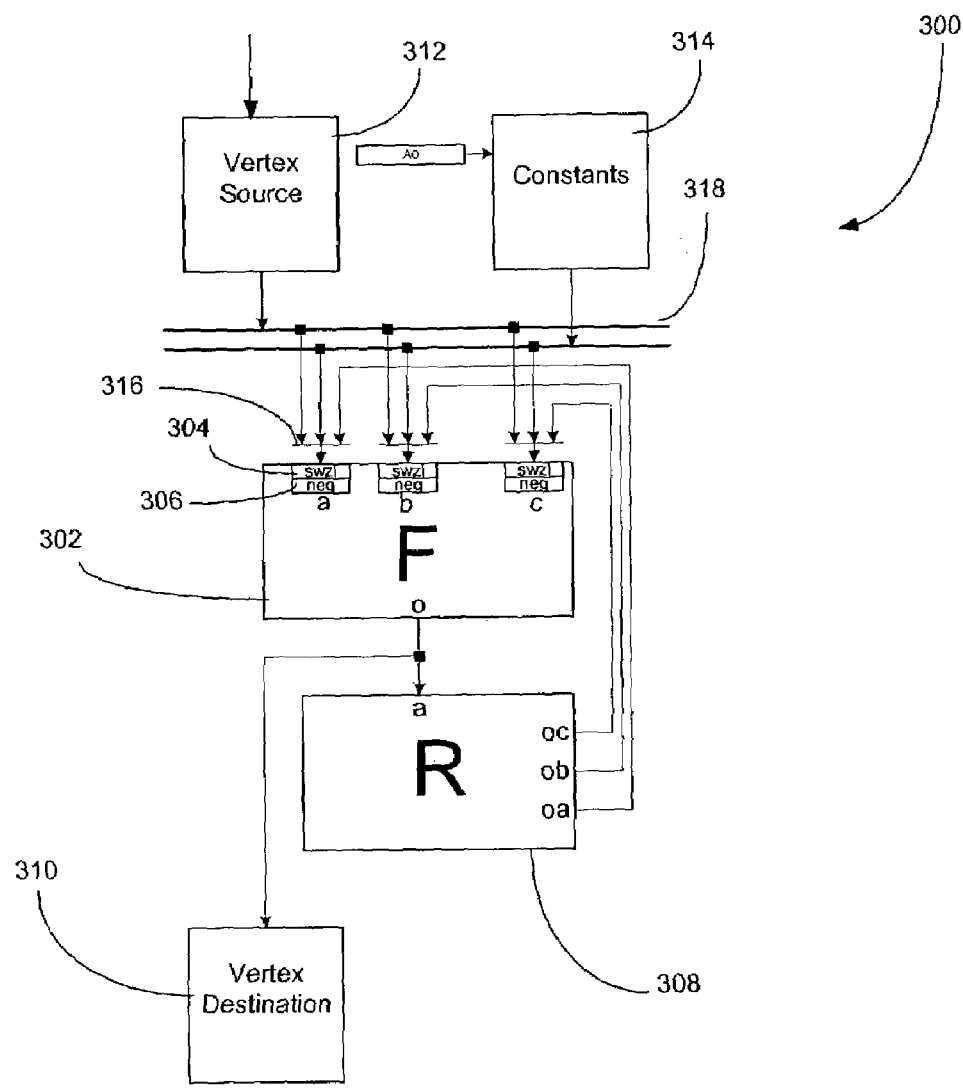
FIG. 3 is a schematic illustrating one embodiment of a programming model in accordance with one embodiment.

FIG. 3 is a schematic illustrating one embodiment of a programming model 300 in accordance with one embodiment. Such programming model 300 may be adapted to work with hardware accelerators of various configuration and/or with central processing unit (CPU) processing.

As shown in FIG. 3, the programming module 300 includes a functional module 302 that is capable of carrying out a plurality of different types of operations. The functional module 302 is equipped with three inputs and an output. Associated with each of the three inputs is a swizzling module 304 and a negating module 306 for purposes that will be set forth hereinafter in greater detail.

Coupled to the output of the functional module 302 is an input of a register 308 having three outputs. Also coupled to the output of the functional module 302 is a vertex destination buffer 310. The vertex destination buffer 310 may include a vector component write mask, and may preclude read access.

Also included are a vertex source buffer 312 and a constant source buffer 314. The vertex source buffer 312 stores data in the form of vertex data, and may be equipped with write access and/or at least single read access. The constant source buffer 314 stores data in the form of constant data, and may also be equipped with write access and/or at least single read access.

Each of the inputs of the functional module 302 is equipped with a multiplexer 316. This allows the outputs of the register 308, vertex source buffer 312, and constant source buffer 314 to be fed to the inputs of the functional module 302. This is facilitated by buses 318.

Figure 4:
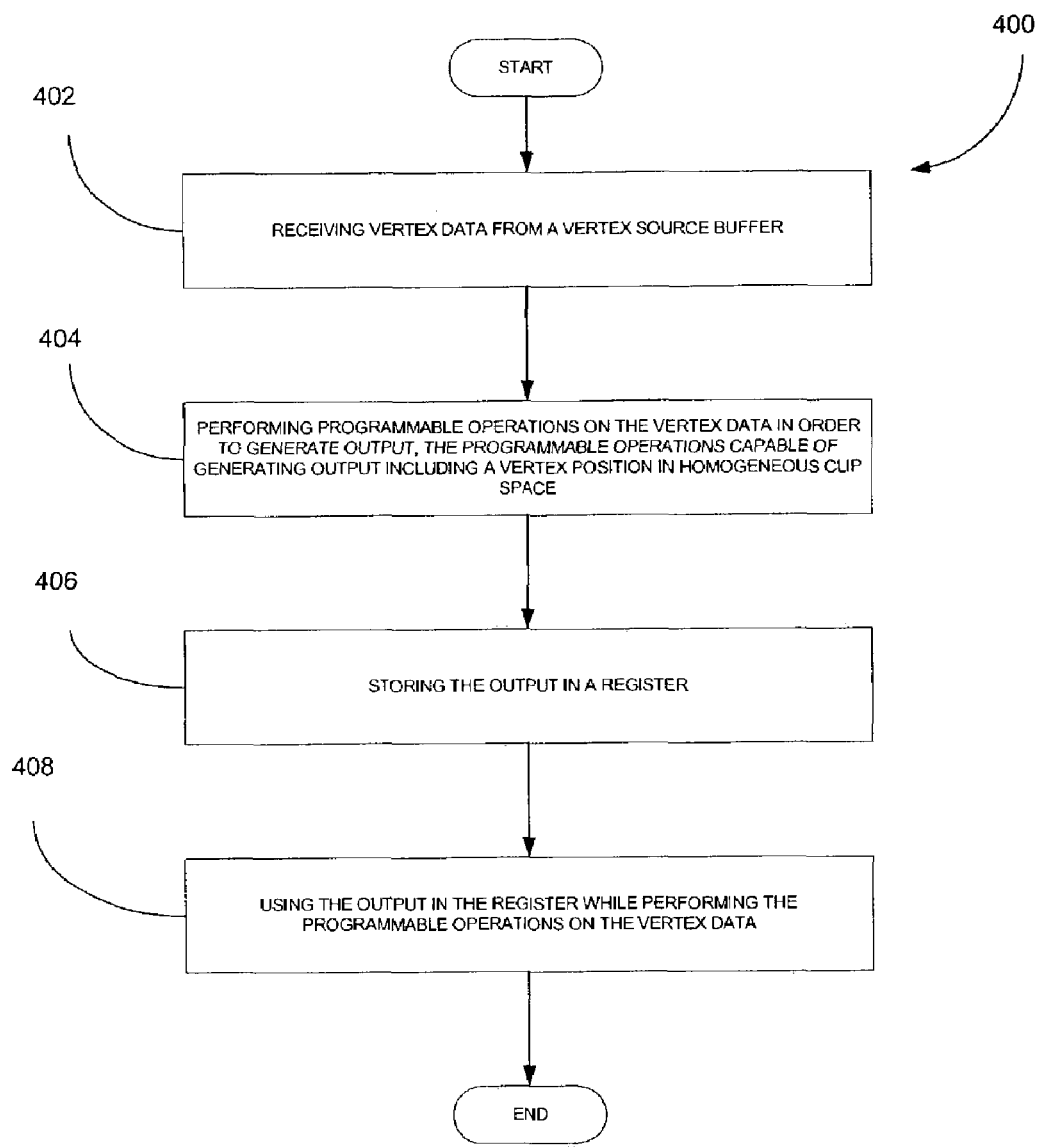
FIG. 4 is a flowchart illustrating the method by which the programming model of FIG. 3 carries out programmable vertex processing in the computer graphics pipeline.

FIG. 4 is a flowchart illustrating the method 400 by which the model of FIG. 3 carries out programmable vertex processing in the computer graphics pipeline 100. Initially, in operation 402, data is received from a vertex source buffer 312. Such data may include any type of information that is involved during the processing of vertices in the computer graphics pipeline 100. Further, the vertex source buffer 312 may include any type of memory capable of storing data.

Thereafter, in operation 404, programmable operations, i.e. vertex processing 102, are performed on the data in order to generate output. The programmable operations are capable of generating output including at the very least a position of a vertex in homogeneous clip space. In one embodiment, such position may be designated using Cartesian coordinates each with a normalized range between −1.0 and 1.0. As will soon become apparent, branching may occur between the programmable operations. Further, conditional codes may be used during the course of such branching, as well as in conjunction with write masks.

The output is then stored in the register 308 in operation 406. During operation 408, the output stored in the register 308 is used in performing the programmable operations on the data. Thus, the register 308 may include any type of memory capable of allowing the execution of the programmable operations on the output.

By this design, the present embodiment allows a user to program a portion of the graphics pipeline 100 that handles vertex processing. This results in an increased flexibility in generating visual effects. Further, the programmable vertex processing of the present embodiment allows remaining portions of the graphics pipeline 100 to be controlled by the standard application program interface (API) for the purpose of preserving hardware optimizations.

During operation, only one vertex is processed at a time in the functional module 302 that performs the programmable operations. As such, the vertices may be processed independently. Further, the various foregoing operations may be processed for multiple vertices in parallel.

In one embodiment, a constant may be received, and the programmable operations may be performed based on the constant. During operation, the constant may be stored in and received from the constant source buffer 314. Further, the constant may be accessed in the constant source buffer 314 using an absolute or relative address. As an option, there may be one or more address registers for use during reads from the constant source buffer 314. It may be initialized to 0 at the start of program execution in operation 204 of FIG. 2. Further, the constant source buffer 314 may be written with a program which may or may not be exposed to users.

The register 308 may be equipped with single write and triple read access. Register contents may be initialized to (0,0,0,0) at the start of program execution in operation 204 of FIG. 2. It should be understood that the output of the functional module 302 may also be stored in the vertex destination buffer 310. The vertex position output may be stored in the vertex destination buffer 310 under a predetermined reserved address. The contents of the vertex destination buffer 310 may be initialized to (0,0,0,1) at the start of program execution in operation 204 of FIG. 2.

As an option, the programmable vertex processing may include negating the data, as well as calculating an absolute value. Still yet, the programmable vertex processing may also involve swizzling the data. Data swizzling is useful when generating vectors. Such technique allows the efficient generation of a vector cross product and other vectors.

In one embodiment, the vertex source buffer 312 may be 16 quad-words in size (16*128 bits). Execution of the present embodiment may be commenced when Param[0]/Position is written. All attributes may be persistent. That is, they remain constant until changed. Table 1 illustrates the framework of the vertex source buffer 312. It should be noted that the number of textures supported may vary across implementations.

TABLE 1

| Program Mode | Standard API | |
| --- | --- | --- |
| Param[0] X,Y,Z,W | Position | X,Y,Z,W |
| Param[1] X,Y,Z,W | Skin Weights | W,W,W,W |
| Param[2] X,Y,Z,W | Normal | X,Y,Z,* |
| Param[3] X,Y,Z,W | Diffuse Color | R,G,B,A |
| Param[4] X,Y,Z,W | Specular Color | R,G,B,A |
| Param[5] X,Y,Z,W | Fog | F,*,*,* |
| Param[6] X,Y,Z,W | Point Size | P,*,*,* |
| Param[7] X,Y,Z,W | | *,*,*,* |
| Param[8] X,Y,Z,W | Texture0 | S,T,R,Q |
| Param[9] X,Y,Z,W | Texture1 | S,T,R,Q |
| Param[10] X,Y,Z,W | Texture2 | S,T,R,Q |
| Param[11] X,Y,Z,W | Texture3 | S,T,R,Q |
| Param[12] X,Y,Z,W | Texture4 | S,T,R,Q |
| Param[13] X,Y,Z,W | Texture5 | S,T,R,Q |
| Param[14] X,Y,Z,W | Texture6 | S,T,R,Q |
| Param[15] X,Y,Z,W | Texture7 | S,T,R,Q |

In another embodiment, the vertex destination buffer 310 may be 15 or so quad-words in size and may be deemed complete when the program is finished. The following exemplary vertex destination buffer addresses are pre-defined to fit a standard pipeline. Contents are initialized to (0,0,0,1) at start of program execution in operation 204 of FIG. 2. Further, a vector condition code register is initialized as equal to 0.0 at the start of program. Writes to locations that are not used by the downstream hardware may be ignored.

A reserved address (HPOS) may be used to denote the homogeneous clip space position of the vertex in the vertex destination buffer 310. It may be generated by the geometry program. Table 2 illustrates the various locations of the vertex destination buffer 310 and a description thereof.

TABLE 2

| Location | Description | |
| --- | --- | --- |
| HPOS | HClip Position | x,y,z,w (−w to +w) |
| BCOL0 | Back Color0 (diff) | r,g,b,a (0.0 to 1.0) |
| BCOL1 | Back Color1 (spec) | r,g,b,a (0.0 to 1.0) |
| COL0 | Color0 (diff) | r,g,b,a (0.0 to 1.0) |
| COL1 | Color1 (spec) | r,g,b,a (0.0 to 1.0) |
| FOGP | Fog Parameter | f,*,*,* |
| PSIZ | Point Size | p,*,*,* |
| PDIS0 | Planar Distance0 | d,*,*,* |
| PDIS1 | Planar Distance1 | d,*,*,* |
| PDIS2 | Planar Distance2 | d,*,*,* |
| PDIS3 | Planar Distance3 | d,*,*,* |
| PDIS4 | Planar Distance4 | d,*,*,* |
| PDIS5 | Planar Distance5 | d,*,*,* |

TABLE 2-continued

| | | |
| --- | --- | --- |
| TEX0 | Texture0 | s,t,r,q |
| TEX1 | Texture1 | s,t,r,q |
| TEX2 | Texture2 | s,t,r,q |
| TEX3 | Texture3 | s,t,r,q |
| TEX4 | Texture4 | s,t,r,q |
| TEX5 | Texture5 | s,t,r,q |
| TEX6 | Texture6 | s,t,r,q |
| TEX7 | Texture7 | s,t,r,q |
| HPOS | homogeneous clip space position float[4] x,y,z,w standard graphics pipeline process further (clip check, perspective divide, viewport scale and bias). | |
| COL0/BCOL0 COL1/BCOL1 | color0 (diffuse) color1 (specular) float[4] r,g,b,a each component gets clamped to (0.0,1.0) before interpolation each component is interpolated at least as 8-bit unsigned integer. | |
| TEX0–7 | textures 0 to 7 float[4] s,t,r,q each component is interpolated as high precision float,followed by division of q and texture lookup. Extra colors could use texture slots. Advanced fog can be done as a texture. | |
| FOGP | fog parameter float[1] f (distance used in fog equation) gets interpolated as a high precision float and used in a fog evaluation (linear, exp,exp2) generating a fog color blend value. | |
| PSIZ | point size float[1] p gets clamped to (0.0,POINT_SIZE_MAX) and used as point size. | |
| PDIS0–5 | planar distances float[6] pd0–pd5 used for clipping to 6 arbitrary planes | |

An exemplary assembly language that may be used in one implementation of the present embodiment will now be set forth. In one embodiment, no branching instructions may be allowed for maintaining simplicity. It should be noted, however, that branching may be simulated using various combinations of operations. Table 3 illustrates a list of the various resources associated with the programming model 300 of FIG. 3. Also shown is a reference format associated with each of the resources along with a proposed size thereof.

TABLE 3

| Resources: | |
| --- | --- |
| Vertex Source - v[*] | of size 16 vectors |
| Constant Memory - c[*] | of size 256 vectors (4096B) |
| Address Register - A0–A1 | of size 2 signed integer vectors |
| Data Registers - R0–R15 | of size 16 vectors (256B) |
| Condition Codes - CC | of size 1 vector (1B) |
| Vertex Destination - o[*] Instruction Storage | of size 280 instructions |

Note: Data Registers,Source,and Constants may be four component floats. The address registers may be a vector of 4 signed integers from −512 to +511.

For example, the constant source buffer 314 may be accessed as c[*] (absolute) or as c[A0.x+*], c[A1.w+*], c[A0.z+*], c[A0.w+*] (relative). In the relative case, a signed address register may be added to the non-negative read address. Out of range address reads may result in (0,0,0,0). In one embodiment, the vertex source buffer 312, vertex destination buffer 310, address registers, and register 308 may not necessarily use relative addressing.

Float vector components and condition codes may be swizzled before use via four subscripts (xyzw). Accordingly, an arbitrary component re-mapping may be done. Examples of swizzling commands are shown in Table 4.

TABLE 4

| .xyzw means source(x,y,z,w) → input(x,y,z,w) |
| .zzxy means source(x,y,z,w) → input(z,z,x,y) |
| .xxxx means source(x,y,z,w) → input(x,x,x,x) |

Table 5 illustrates an optional shortcut notation of the assembly language that may be permitted.

TABLE 5

| No subscripts is the same as .xyzw |
| .x is the same as .xxxx |
| .y is the same as .yyyy |
| .z is the same as .zzzz |
| .w is the same as .wwww |

Float source operands may have their absolute value taken by putting a before the source and another '|' after the source. Moreover, the float source operands may be negated by putting a '−' sign in front of the above notation. Moreover, an absolute value of the source operands may be calculated.

The condition codes (CC) may be changed whenever data is written (by adding a 'c' to the opcode) and shares the writemask with the destination. If there is no other destination, condition codes RC may be used as a dummy write register.

Figure 4A:
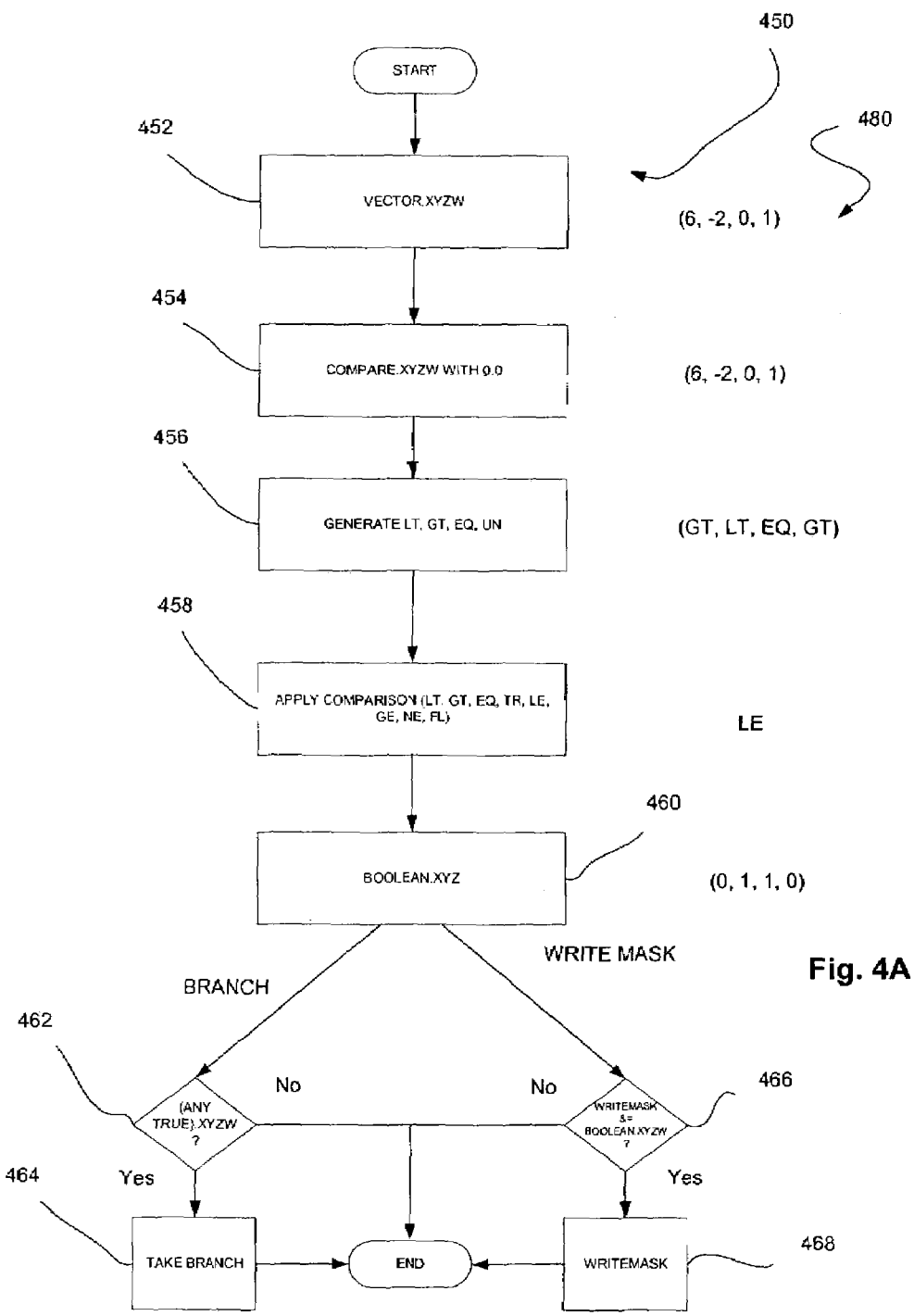
FIG. 4A illustrates a more specific exemplary method for programmable vertex processing, in accordance with another embodiment.

FIG. 4A illustrates a more specific exemplary method 450 for programmable vertex processing, in accordance with another embodiment. In one example, the present method 450 may be implemented in the context of the method 400 of FIG. 4. Of course, it should be noted that the present method 450 and the related features may be carried out in any desired context.

As shown in FIG. 4A, a vector is received in operation 452. As set forth earlier, such vector may be multi-dimensional. Specifically, in one embodiment, such vectors may include a plurality of components (i.e. four components, etc.). Moreover, multiple subscripts may be employed (i.e. x-subscript, y-subscript, z-subscript, w-subscript, etc.).

In operation 454, each vector component is compared to 0.0. An associated status may then be generated based on the comparison. Note operation 456. There may be four (4) status states: LT (less than), EQ (equal), GT (greater than), and UN (unordered). UN stands for unordered and means that the source was not a number (NaN). The statuses may be recorded in a condition code status register if the writemask for that component is enabled. Table 5A illustrates various exemplary statuses that may be stored based on the comparison in accordance with operation 456.

TABLE 5A

| if (x < 0) field = LT; |
|   else if (x == 0) field = EQ; |
|   else if (x > 0) field = GT; |
|   else field = UN; |

When data is written, the condition code status register is evaluated based on a user-defined comparison in operation 458. The condition codes are sourced as EQ(equal), NE(not equal), LT(less), GE(greater or equal), LE(less or equal), GT(greater), FL(false), and TR(true). Such values may be stored using a 2-bit field. In operation 460, 4-bits of condition code are generated by applying the specified comparison. Table 5B illustrates a generic exemplary evaluation to generate the Boolean expression.

TABLE 5B

| if (x <= 0) | |
| if (NAN) | → False |
| else if (LT) | → True |
| else if (EQ) | → True |
| else | → False |

An example of operations 452–460 in use is shown in parallel to such operations in FIG. 4A. See 480. As shown, a vector (6, −1, 0, 1) is received, after which each components is compared to 0.0 in accordance with operation 454 to generate a status thereof in accordance with the rules of Table 5A. Note operation 456. In the present example, such status would include (GT, LT, EQ, GT), since 6 is greater than (GT) 0.0., −2 is less than (LT) 0.0, and so on. Next, in accordance with operation 458, a user-defined comparison operation [i.e. less than or equal (LE)] is applied. Since LT and EQ would fall under LE, and GT would not, the Boolean expression (0, 1, 1, 0) would result in accordance with the rules of Table 5B. Note operation 460.

As a source (for branch and writemask modification), the condition codes may be swizzled. Writes to the register 308, address registers, vertex destination buffer 310, and the condition codes are maskable. Each component is written only if it appears as a destination subscript (from xyzw). Swizzling is not necessarily possible for writes and subscripts are ordered (x before y before z before w).

It is also possible to modify the write mask by the condition codes (at the beginning of the instruction). It may then be determined in decision 466 whether the write mask is to be modified by the condition codes. If so, a masked write is carried out in operation 468.

In one embodiment, this may be accomplished by utilizing an 'AND' operation in a manner shown in Table 6. It should be noted that the condition codes (sourced as EQ, NE, LT, GE, LE, GT, FL, TR) have swizzle control here.

TABLE 6

| destination(GT.x) | //writemask[4] = 1111 & GT.xxxx |
| destination.xw(EQ.yyzz) | //writemask[4] = 1001 & EQ.yyzz |
| An exemplary assembler format is as follows: | |
| OPCODE[c] DESTINATION,SOURCE(S); | |

An optional branch operation may also be carried out based on decision 462. In particular, if any component of the vector is TRUE (i.e. "1"), a branch may be executed in operation 464. More information relating to such branch operation will be set forth hereinafter in greater detail.

Generated data may be written to the register 308, the address registers, the vertex buffer 310, or the condition codes RC. Output data may be taken from the functional module 302. Table 6A illustrates commands in the proposed assembler format which write output to the register 308 or the vertex destination buffer 310.

TABLE 6A

| ADDc R4,R1,|R2|; | //result goes into R4, update CC |
| ADD o[HPOS],−R1,R2; | //result goes into the destination buffer |

TABLE 6A-continued

| | |
|---|---|
| ADD R4.xy,R1,R2; | //result goes into x,y components of R4 |
| ADDc CC.xy(GT.w),R1,R2; | //GT.w ? CC.xy = ADD results compared to 0.0 |

During operation, the programmable vertex processing is adapted for carrying out various instructions of an instruction set using any type of programming language including, but not limited to that set forth hereinabove. Such instructions may include, but are not limited to an address register load operation, a move address register operation, a set signum operation, a branch operation, a call operation, a return operation, a cosine operation, a sine operation, a floor operation, a fraction operation, a set-on-equal-to operation, a set false operation, a set-on-greater-than, a set-on-less-than-or-equal operation, a set-on-not-equal-to operation, a set true operation, a no operation, address register load, move, multiply, addition, multiply and addition, reciprocal, reciprocal square root, three component dot product, four component dot product, distance vector, minimum, maximum, set on less than, set on greater or equal than, exponential base two (2), logarithm base two (2), exponential, logarithm, and/or light coefficients. Table 7 illustrates the operation code associated with each of the foregoing instructions. Also indicated is a number of inputs and outputs as well as whether the inputs and outputs are scalar or vector.

TABLE 7

| OPCODE | INPUT(scalar or vector) | OUTPUT(scalar or vector) |
|---|---|---|
| ADD[c] | v,v | v |
| ARL[c] | v | a |
| ARR[c] | v | a |
| BRA | CC | |
| CAL | CC | |
| COS[c] | s | ssss |
| DP3[c] | v,v | ssss |
| DP4[c] | v,v | ssss |
| DST[c] | v,v | v |
| EX2[c] | s | ssss |
| EXP[c] | s | v |
| FLR[c] | v | v |
| FRC[c] | v | v |
| LG2[c] | s | ssss |
| LIT[c] | v | v |
| LOG[c] | s | v |
| MAD[c] | v,v,v | v |
| MAX[c] | v,v | V |
| MIN[c] | v,v | v |
| MOV[c] | v | v |
| MUL[c] | v,v | v |
| MVA[c] | a | a |
| NOP | | |
| RET | CC | |
| RCP[c] | s | ssss |
| RSQ[c] | s | ssss |
| SEQ[c] | v,v | v |
| SFL[c] | | v |
| SGE[c] | v,v | v |
| SGT[c] | v,v | v |
| SIN[c] | s | ssss |
| SLE[c] | v,v | v |
| SLT[c] | v,v | v |
| SNE[c] | v,v | v |
| SSG[c] | v | v |
| STR[c] | | v |

As shown in Table 7, each of the instructions includes an input and an output which may take the form of a vector and/or a scalar. It should be noted that such vector and scalar inputs and outputs may be handled in various ways. Further information on dealing with such inputs and outputs may be had by reference to an application entitled "METHOD, APPARATUS AND ARTICLE OF MANUFACTURE FOR A TRANSFORM MODULE IN A GRAPHICS PROCESSOR" filed Dec. 6, 1999 under Ser. No. 09/456,102, now issued under U.S. Pat. No. 6,353,439, which is incorporated herein by reference in its entirety.

These various instructions may each be carried out using a unique associated method and data structure. Such data structure includes a source location identifier indicating a source location of data to be processed. Such source location may include a plurality of components. Further provided is a source component identifier indicating in which of the plurality of components of the source location the data resides. The data may be retrieved based on the source location identifier and the source component identifier. This way, the operation associated with the instruction at hand may be performed on the retrieved data in order to generate output.

Also provided is a destination location identifier for indicating a destination location of the output. Such destination location may include a plurality of components. Further, a destination component identifier is included indicating in which of the plurality of components of the destination location the output is to be stored. In operation, the output is stored based on the destination location identifier and the destination component identifier.

Figure 5:
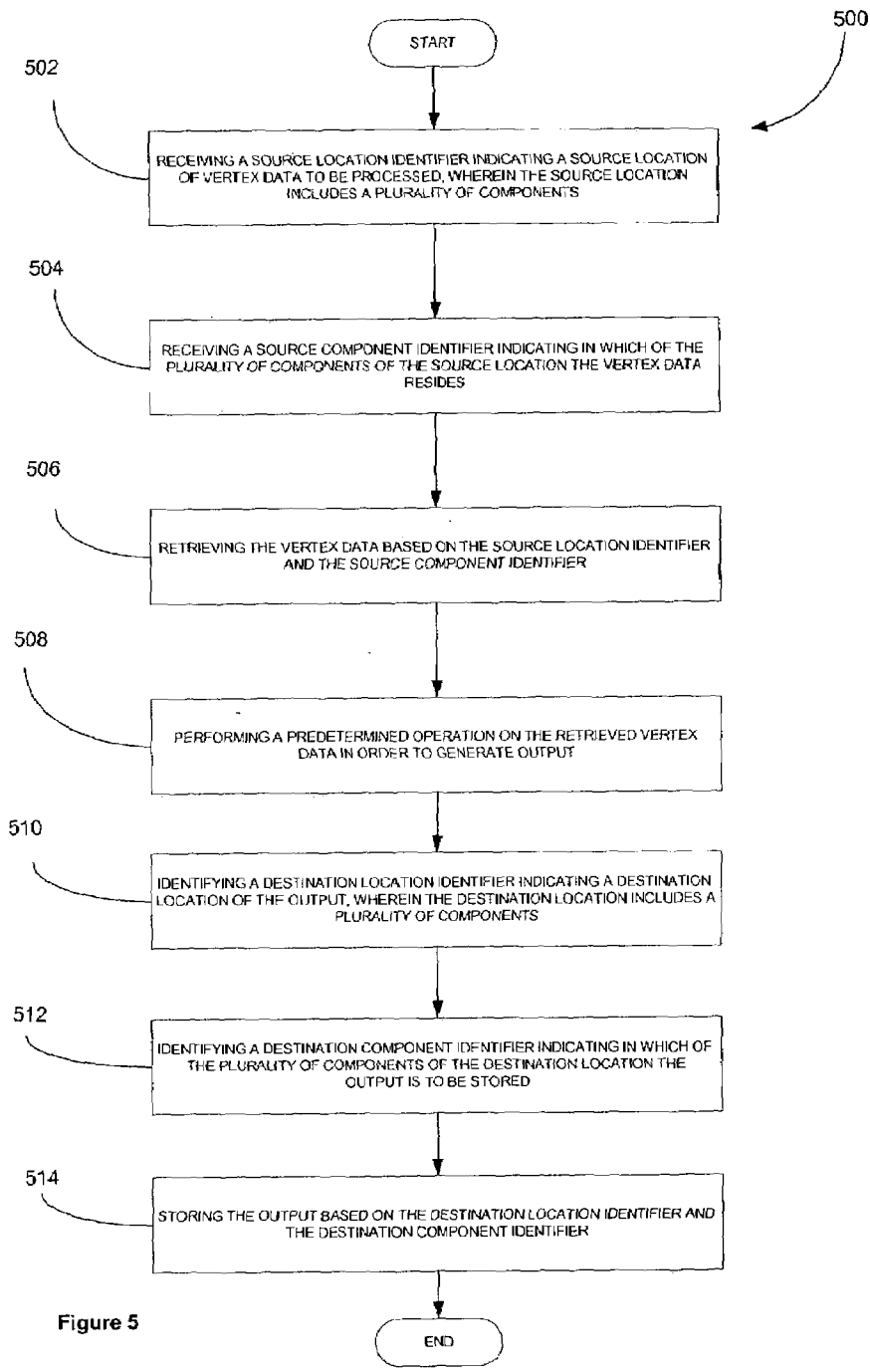
FIG. 5 is a flowchart illustrating the method in a data structure is employed to carry out graphics instructions in accordance with one embodiment.

FIG. 5 is a flowchart illustrating the method 500 in which the foregoing data structure is employed in carrying out the instructions in accordance with one embodiment. First, in operation 502, the source location identifier is received indicating a source location of data to be processed. Thereafter, in operation 504, the source component identifier is received indicating in which of the plurality of components of the source location the data resides.

The data is subsequently retrieved based on the source location identifier and the source component identifier, as indicated in operation 506. Further, the particular operation is performed on the retrieved data in order to generate output. See operation 508. The destination location identifier is then identified in operation 510 for indicating a destination location of the output. In operation 512, the destination component identifier is identified for indicating in which of the plurality of components of the destination location the output is to be stored. Finally, in operation 514, the output is stored based on the destination location identifier and the destination component identifier.

As an option, branching among programmable operations may be carried out in the context of the present embodiment. Table 7A illustrates a possible general structure of a vertex program with branching.

TABLE 7A

| | |
|---|---|
| !!VP2.0 | |
| LABEL: | // label table start, only used for indexed branch |
|     0:NV_START | // index 0 |
|     2:LBL3 | // index 2 |
|     1:LBL_HI | // index 1 |
| CODE: | |
| MAIN: | // entry point |
|     OpCode | |
|     Opcode | |
|     OpCode | |
|     ... | |
| LBL_HI: | // branch target |
|     OpCode | |

TABLE 7A-continued

| | | |
|---|---|---|
| LBL1: | | // branch target |
| | OpCode | |
| | RET | // end of MAIN |
| NV_START: | | // subroutine |
| | OpCode | |
| | ... | |
| | RET | // end of subroutine |
| LBL3: | | // subroutine |
| | OpCode | |
| | ... | |
| | RET | // end of subroutine |
| END | | |

It should be noted that the program of Table 7A is divided into a number of sections. Table 7B sets forth each of such sections.

TABLE 7B 1. a header of !!VP2.0
2. an optional LABEL (reserved keyword) block containing the labels in the program that the programmer wants indexed. Up to 16 labels can be indexed from 0 to 15
3. a mandatory CODE (reserved keyword) block
4. a mandatory MAIN (reserved keyword) entry point (must be in CODE block)
5. a mandatory END (reserved keyword)

It should be understood that branches/calls/returns are conditional, based on the condition code register. Moreover, branches/calls may be done to any label or to the index stored in an address register. In one embodiment, only a certain number (i.e. 16) of indexes (i.e. 0–15) may exist, and clamping may be performed to this range. Trying to access an uninitialized index may terminate the program.

As an option, there may be an address stack for use by subroutine call/return. Such address stack may be of depth four (4). In such embodiment, a call attempting to push a fifth ($5^{th}$) return address may terminate the program. Further, a return attempting to pop an empty address stack will terminate the program.

To prevent the hardware from hanging, any program may be terminated after executing a certain number of instructions (i.e. $65536^{th}$ instruction). If a program is prematurely terminated, the current state of the output buffer may be the final program output.

Further information will now be set forth regarding each of the instructions set forth in Table 7. In particular, an exemplary format, description, operation, and examples are provided using the programming language set forth earlier. Table 7C illustrates a pseudo-macros that may be used for the operation code descriptions which follow.

TABLE 7C

```
#define GET_SOURCE(source,var) {
        /* swizzle phase */
        var.x = source.c***;          /* c is x or y or z or w */
        var.y = source.*c**;
        var.z = source.**c*;
        var.w = source.***c;
        /* abs phase */
        if (absolute value modifier)
              var.xyzw = abs(var.xyzw);
        /* negate phase */
        if (negate modifier)
              var.xyzw = -var.xyzw;
}
```

TABLE 7C-continued

```
#define GET_CC(b)
        /* swizzle phase (get CC status {LT,EQ,GT,UN}) */
        b.x = CC.c***;                /* c is x or y or z or w */
        b.y = CC.*c**;
        b.z = CC.**c*;
        b.w = CC.***c;
        /* comparison phase (apply EQ,FL,GE,GT,LE,LT,NE,TR) */
        b.x = compare_function(b.x);  /* TRUE or FALSE */
        b.y = compare_function(b.y);  /* TRUE or FALSE */
        b.z = compare_function(b.z);  /* TRUE or FALSE */
        b.w = compare_function(b.w);  /* TRUE or FALSE */
}
#define SET_DESTINATION(dest,var) {
        GET_CC(b)     /* default is TR,causing b.xyzw = (1,1,1,1) */
        if (dest is register or output) {
              if (writemask.x & b.x) dest.x = var.x;
              if (writemask.y & b.y) dest.y = var.y;
              if (writemask.z & b.z) dest.z = var.z;
              if (writemask.w & b.w) dest.w = var.w;
        }
        if (dest is CC) {
              s.x = Compare(var.x,0.0);   /* giving {LT,EQ,GT,UN} */
              s.y = Compare(var.y,0.0);   /* giving {LT,EQ,GT,UN} */
              s.z = Compare(var.z,0.0);   /* giving {LT,EQ,GT,UN} */
              s.w = Compare(var.w,0.0);   /* giving {LT,EQ,GT,UN} */
              if (writemask.x & b.x) CC.x = s.x;
              if (writemask.y & b.y) CC.y = s.y;
              if (writemask.z & b.z) CC.z = s.z;
              if (writemask.w & b.w) CC.w = s.w;
        }
}
```

Add (ADD)
Format:
    ADD[c] D[.xyzw][(CC[.xyzw])],[-][|]S0[.xyzw][|],
                                 [-][|]S1[.xyzw][|]
Description:
    The present instruction adds sources into a destination.
Operation:

Table 8A sets forth an example of operation associated with the ADD instruction.

TABLE 8A

```
GET_SOURCE(S0,t)
GET_SOURCE(S1,u)
q.x = t.x+u.x;
q.y = t.y+u.y;
q.z = t.z+u.z;
q.w = t.w+u.w;
SET_DESTINATION (D,q)
```
Examples:
    ADD R6,R5.x,c[CON5] R6.xyzw = R5.x + c[CON5].xyzw
    ADD R6.x,R5,-R7 R6.x = R5.x − R7.x
    ADD R6,-R5,c[CON5] R6.xyzw = -R5.xyzw + c[CON5].xyzw
Address Register Load - floor - (ARL)
Format:
    ARL A0[c] D[.xyzw][(CC[.xyzw])],[-][|]S0[.xyzw][|]

Description:
    The contents of source scalar are moved into a specified address register (A0 or A1). Source may have one subscript. Destination may have an ".xyzw" subscript. In one embodiment, the only valid address register may be designated as "A0.x." The address register "A0.x" may be used as a base address for constant reads. The source may be a float that is truncated towards negative infinity into a signed integer, and clamped in the range: −512, +511. In one embodiment, ARL cannot necessarily modify the condition codes.

Operation:

Table 8B sets forth an example of operation associated with the ARL instruction.

TABLE 8B

```
GET_SOURCE(S0,t)
q.x = floor(t.x); if (q.x < −512) q.x = −512; else
if (q.x > 511) q.x = 511;
q.y = floor(t.y); if (q.y < −512) q.y = −512; else
if (q.y > 511) q.y = 511;
q.z = floor(t.z); if (q.z < −512) q.z = −512; else
if (q.z > 511) q.z = 511;
q.w = floor(t.w); if (q.w < −512) q.w = −512; else
if (q.w > 511) q.w = 511;
SET_DESTINATION (D,q)
```

Examples:
  ARL A0.x,v[7].w (move vertex scalar into address register 0)
  MOV R6,c[A0.x+7] (move constant at address A0.x+7 into register R6)

Address Register Load—round—(ARR)

Format:
  ARR[c] D[.xyzw][(CC[.xyzw])],[−][!]S0[.xyzw][!]

Description:

The contents of the source are moved into a specified address register (A0 or A1). It can be used as a base address for constant reads, branch index, and writemask modifier. The source is a float vector that is rounded (to nearest even) into a signed integer, and clamped in the range: −512,+511.

Operation:

Table 8C sets forth an example of operation associated with the ARR instruction.

TABLE 8C

```
GET_SOURCE(S0,t)
q.x = round(t.x); if (q.x < −512) q.x = −512; else
if (q.x > 511) q.x = 511;
q.y = round(t.y); if (q.y < −512) q.y = −512; else
if (q.y > 511) q.y = 511;
q.z = round(t.z); if (q.z < −512) q.z = −512; else
if (q.z > 511) q.z = 511;
q.w = round(t.w); if (q.w < −512) q.w = −512; else
if (q.w > 511) q.w = 511;
SET_DESTINATION(D,q)
```

Examples:
  ARR A0,v[7] //Move vertex vector into address register 0.
  MOV R6,c[A1.y+7]; //Move constant at address A1.y+7 into register R6. 0

Branch,Call,Return (BRA,CAL,RET)

Format:
  BRA CC[.xyzw],Label
  BRA CC[.xyzw],A0. [xyzw]+Imm
  CAL CC[.xyzw],Label
  CAL CC[.xyzw],A0.[xyzw]+Imm
  RET CC[.xyzw]

Description:

Conditional branch, subroutine call, and subroutine return are set forth herein. Condition is based on the condition code bits ORed together after a swizzle operation. A taken CAL pushes the return address only onto a stack. A taken RET pops the return address off this stack. The address register may be a scalar and the immediate constant between 0–511 is added to it, the sum clamped to 0–15 and then used as the index of the label to branch to. Branch/Call/Return cannot necessarily modify CC. The default branch condition is TR.

Operation:

Table 8D sets forth an example of operation associated with the BRA, CAL, RET instruction.

TABLE 8D

```
GET_CC(b)
if (b.x | b.y | b.z | b.w)
   branch/call/return;
```

Examples:
  BRA Gat.x,Label_0; //Branch to Label_0 if CC.x is >0.0
  CAL TR,A0.z+2; //Call to jumptable[A0.z+2]

Cosine (COS)

Format:
  COS[c] D[.xyzw][(CC[.xyzw])],[−][!]S0.[xyzw][!]

Description:

A cosine function is provided. The source should be a scalar. Input may be an unbounded angle in radians.

Operation:

Table 8E sets forth an example of operation associated with the COS instruction.

TABLE 8E

```
GET_SOURCE(S0,t)
q.x = q.y = q.z = q.w = COS(t.x); where
|ieee_cos(t.x)−COS(t.x)| < 1/(2**22) for 0.0 <=
t.x < 2PI
SET_DESTINATION(D,q)
```

Examples:
  COS R0,R3.w;

Three Component Dot Product (DP3)

Format:
  DP3[c] D[.xyzw][(CC[.xyzw])],[−][!]S0[.xyzw],[−]][!],
    [−][!] S1[.xyzw][!]

Description:

The present instruction performs a three component dot product of the sources into a destination. It should be noted that 0.0 times anything is 0.0.

Operation:

Table 8F sets forth an example of operation associated with the DP3 instruction.

TABLE 8F

```
GET_SOURCE(S0,t)
GET_SOURCE(S1,u)
q.x = q.y = q.z = q.w = t.x*u.x + t.y*u.y + t.z*u.z;
SET_DESTINATION(D,q)
```

Examples:

| | |
|---|---|
| DP3 | R6,R3,R4 |

R6.xyzw=R3.x*R4.x+R3.y*R4.y+R3.z*R4.z

| | |
|---|---|
| DP3 | R6.w,R3,R4 |

R6.w=R3.x*R4.x+R3.y*R4.y+R3.z*R4.z

Four Component Dot Product (DP4)

Format:
  DP4[c] D[.xyzw][(CC[.xyzw])],[-][!]S0[.xyzw][=1], [-][!]S1[.xyzw][!]

Description:
  The present instruction performs a four component dot product of the sources into a destination. It should be noted that 0.0 times anything is 0.0.

Operation:
  Table 8G sets forth an example of operation associated with the DP4 instruction.

TABLE 8G

GET_SOURCE(S0,t)
GET_SOURCE(S1,u)
q.x = q.y = q.z = q.w = t.x*u.x + t.y*u.y + t.z*u.z + t.w*u.w;
SET_DESTINATION(D,q)

Examples:

| | |
|---|---|
| DP4 | R6,v[POS],c[MV0] |

R6.xyzw=v.x*c.x+v.y*c.y+v.z*c.z+v.w*c.w

| | |
|---|---|
| DP4 | R6,xw,v[POS].w,R3 |

R6.xw=v.w*R3.x+v.w*R3.y+v.w*R3.z+v.w*R3.w

Distance Vector (DST)

Format:
  DST[c] D[.xyzw][(CC [.xyzw])],[-][!]S1[.xyzw][!], [-][!]S1[.xyzw][!]

Description:
  The present instruction calculates a distance vector. A first source vector is assumed to be (NA,d*d,d*d,NA) and a second source vector is assumed to be (NA,1/d,NA,1/d). A destination vector is then outputted in the form of (1,d,d*d, 1/d). It should be noted that 0.0 times anything is 0.0.

Operation:
  Table 8H sets forth an example of operation associated with the DST instruction.

TABLE 8H

GET_SOURCE(S0,t)
GET_SOURCE(S1,u)
q.x = 1.0;
q.y = t.y*u.y;
q.z = t.z;
q.w = u.w;
SET_DESTINATION(D,q)

Examples:

EX2 R4,R3,z;

Exponential Base 2 (EX2)

Format:
  EX2[c] D[.xyzw][(CC [.xyzw])], [-][!]S0[.xyzw][!]

Description:
  Provided is an exponential base2 instruction that accepts a scalar source0.
  EX2(-Inf) or underflow gives (0.0,0.0,0.0,0.0)
  EX2(+Inf) or overflow gives (+Inf,+Inf,+Inf,+Inf)

Operation:
  Table 8I sets forth an example of operation associated with the EX2 instruction.

TABLE 8I

GET_SOURCE(S0,t)
tmpA = FLR(t.x);
tmpB = FRC(t.x); /* 0.0 <= tmpB < 1.0 */
q.x = q.y = q.z = q.w = 2^(tmpA) * 2^(tmpB); where
|ieee_exp(tmpB*LN2)-EX2(tmpB)| < 1/(2**20)
SET_DESTINATION(D,q)

Examples:
  EX2 R4,R3.z;

Exponential Base 2 (EXP)

Format:
  EXP[c] D[.xyzw][(CC[.xyzw])],[-][!]S0.[xyzw][!]

Description:
  The present instruction performs an exponential base 2 partial support. It generates an approximate answer in dest.z, and allows for a more accurate answer of dest.x*FUNC (dest.y) where FUNC is some user approximation to 2**dest.y (0.0<=dest.y<1.0). It also accepts a scalar source0. It should be noted that reduced precision arithmetic is acceptable in evaluating dest.z.
  EXP(-Inf) or underflow gives (0.0,0.0,0.0,1.0)
  EXP(+Inf) or overflow gives (+Inf,0.0,+Inf,1.0)

Operation:
  Table 8J sets forth an example of operation associated with the EXP instruction.

TABLE 8J

GET_SOURCE(S0,t)
q.x = 2**TruncateTo-Infinity(t.x);
q.y = t.x - TruncateTo-Infinity(t.x);
q.z = q.x * APPX(q.y); where |ieee_exp(q.y*LN2)-APPX(q.y)| <
1/(2**11) for all 0<=q.y<1.0
q.w = 1.0;
SET_DESTINATION(D,q)

Examples:
  EXP R4,R3.z

Floor (FLR)

Format:
  FLR[c] D[.xyzw][(CC[.xyzw])],[-][!]S0[.xyzw][!]

Description:
  The present instruction sets the destination to the floor of the source.

Operation:
  Table 8K sets forth an example of operation associated with the FLR instruction.

TABLE 8K

```
GET_SOURCE(S0,t)
q.x = floor(t.x);
q.y = floor(t.y);
q.z = floor(t.z);
q.w = floor(t.w);
SET_DESTINATION(D,q)
```

Examples:

FLR R4.z,R3; //R4.z=floor(R3.z)

Fraction (FRC)

Format:

FRC[c] D[.xyzw][(CC[.xyzw])],[-][!]S0[.xyzw][!]

Description:

The present description set the destination to a fractional part of the source. The fraction is 0.0<=fraction<1.0.

Operation:

Table 8L sets forth an example of operation associated with the FRC instruction.

TABLE 8L

```
GET_SOURCE(S0,t)
q.x = t.x - floor(t.x);
q.y = t.y - floor(t.y);
q.z = t.z - floor(t.z);
q.w = t.w - floor(t.w);
SET_DESTINATION(D,q)
```

Examples:

FRC R4.z,R3; //R4.z=R3.z-floor(R3.z)

Logarithm Base 2 (LG2)

Format:

LG2[c] D[.xyzw][(CC[.xyzw])],[-][!]S0.[xyzw][!]

Description:

Logarithm base2 accepts a scalar source0 of which the sign bit is ignored.

LG2(0.0) gives (-Inf,-Inf,-Inf,-Inf)

LG2(Inf) gives (+Inf,+Inf,+Inf,+Inf)

Operation:

Table 8M sets forth an example of operation associated with the LG2 instruction.

TABLE 8M

```
GET_SOURCE(S0,t)
tmpA = exponent(t.x); /* -128 <= tmpA < 128 */
tmpB = mantissa(t.x); /* 1.0 <= tmpB < 2.0 */
q.x = q.y = q.z = q.w = tmpA + log2(tmpB); where
|ieee_log(tmpB)/LN2-LG2(tmpB)| < 1/(2**20)
SET_DESTINATION(D,q)
```

Examples:

LG2 R4,R3.z;

Light Coefficients (LIT)

Format:

LIT[c] D[.xyzw][(CC[.xyzw])],[-][!]S0[.xyzw][!]

Description:

The present instruction provides lighting partial support. It calculates lighting coefficients from two dot products and a power (which gets clamped to -128.0<power<128.0). The source vector is:

Source0.x=n*l (unit normal and light vectors)

Source0.y=n*h (unit normal and halfangle vectors)

Source0.z is unused

Source0.w=power

Reduced precision arithmetic is acceptable in evaluating dest.z. Allowed error is equivalent to a power function combining the LOG and EXP instructions (EXP(w*LOG(y))). An implementation may support at least 8 fraction bits in the power. Note that since 0.0 times anything may be 0.0, taking any base to the power of 0.0 will yield 1.0.

Operation:

Table 8N sets forth an example of operation associated with the LIT instruction.

TABLE 8N

```
GET_SOURCE(S0,t)
if (t.w < -127.9961)    t.w = -127.9961;  /* assuming power
 is s8.8 */
else if (t.w > 127.9961)  t.w = 127.9961;
if (t.x < 0.0) t.x = 0.0;
if (t.y < 0.0) t.y = 0.0;
q.x = 1.0;   /* ambient */
q.y = t.x;   /* diffuse */
q.z = (t.x > 0.0 ? EXP(t.w*LOG(t.y)) : 0.0);    /* specular */
q.w = 1.0;
SET_DESTINATION(D,q)
```

Examples:

LIT R4,R3

Logarithm Base 2 (LOG)

Format:

LOG[c] D[.xyzw][(CC[.xyzw])],[-][!]S0.[xyzw][!]

Description:

The present instruction performs a logarithm base 2 partial support. It generates an approximate answer in dest.z and allows for a more accurate answer of dest.x+FUNC (dest.y) where FUNC is some user approximation of log2 (dest.y) (1.0 <=dest.y<2.0). It also accepts a scalar source0 of which the sign bit is ignored. Reduced precision arithmetic is acceptable in evaluating dest.z.

LOG(0.0) gives (-Inf,1.0,-Inf,1.0)

LOG(Inf) gives (Inf,1.0,Inf,1.0)

Operation:

Table 8O sets forth an example of operation associated with the LOG instruction.

TABLE 8O

```
GET_SOURCE(S0,t)
if (abs(t.x) != 0.0) {
    q.x = exponent(t.x)     (-128.0 <= e < 127)
    q.y = mantissa(t.x)     (1.0 <= m < 2.0)
    q.z = q.x + APPX(q.y)   where |ieee_log(q.y)/LN2-
APPX(q.y)| < 1/(2**11) for 1.0<=q.y<2.0
    q.w = 1.0;
}
else {
    q.x = -inf; q.y = 1.0; q.z = -inf; q.w = 1.0;
}
SET_DESTINATION(D,q)
```

Examples:
    LOG R4,R3.z

Multiply And Add (MAD)

Format:
    MAD[c] D[.xyzw][(CC[.xyzw])],[-][!]S0[.xyzw][!],
        [-][!]S1[.xyzw][!],
        [-][!]S2[.xyzw][!]

Description:
    The present instruction multiplies and adds sources into a destination. It should be noted that 0.0 times anything is 0.0.

Operation:
    Table 8P sets forth an example of operation associated with the MAD instruction.

TABLE 8P

GET_SOURCE(S0,t)
GET_SOURCE(S1,u)
GET_SOURCE(S2,v)
q.x = t.x*u.x+v.x;
q.y = t.y*u.y+v.y;
q.z = t.z*u.z+v.z;
q.w = t.w*u.w+v.w;
SET_DESTINATION(D,q)

Examples:
    MAD R6,-R5,v[POS],-R3 R6=-R5*v[POS]-R3
    MAD R6.z,R5,w,v[POS],R5 R6.z=R5.w*v[POS].z+R5.z Maximum (MAX)

Format:
    MAX[c] D[.xyzw][(CC[.xyzw])],[-][!]S0[.xyzw][!],
        [-][!]S1[.xyzw][!]

Description:
    The present instruction determines a maximum of sources, and moves the same into a destination.

Operation:
    Table 8QX sets forth an example of operation associated with the MAX instruction.

TABLE 8Q

GET_SOURCE(S0,t)
GET_SOURCE(S1,u)
q.x = NaN; if (t.x >= u.x) q.x = t.x; else if (t.x < u.x) q.x = u.x;
q.y = NaN; if (t.y >= u.y) q.y = t.y; else if (t.y < u.y) q.y = u.y;
q.z = NaN; if (t.z >= u.z) q.z = t.z; else if (t.z < u.z) q.z = u.z;
q.w = NaN; if (t.w >= u.w) q.w = t.w; else if (t.w < u.w) q.w = u.w;
SET_DESTINATION(D,q)

Examples:
    MAX R2,R3,R4 R2=component max(R3,R4)
    MAX R2.w,R3.x,R4 R2.w=max(R3.x,R4.w)

Minimum (MIN)

Format:
    MIN[c] D[.xyzw][(CC[.xyzw])],[-][!]S0[.xyzw][!],
        [-][!]S1[.xyzw][!]

Description:
    The present instruction determines a minimum of sources, and moves the same into a destination.

Operation:
    Table 8R sets forth an example of operation associated with the MIN instruction.

TABLE 8R

GET_SOURCE(S0,t)
GET_SOURCE(S1,u)
q.x = NaN; if (t.x < u.x) q.x = t.x; else if (t.x >= u.x) q.x = u.x;
q.y = NaN; if (t.y < u.y) q.y = t.y; else if (t.y >= u.y) q.y = u.y;
q.z = NaN; if (t.z < u.z) q.z = t.z; else if (t.z >= u.z) q.z = u.z;
q.w = NaN; if (t.w < u.w) q.w = t.w; else if (t.w >= u.w) q.w = u.w;
SET_DESTINATION(D,q)

Examples:
    MIN R2,R3,R4 R2=component min(R3,R4)
    MIN R2.x,R3.z,R4 R2.x=min(R3.z,R4.x)

Mov (MOV)

Format:
    MOV[c] D[.xyzw][(CC[.xyzw])],[-][!]S0[.xyzw][!]

Description:
    The contents of a designated source are moved into a destination.

Operation:
    Table 8S sets forth an example of operation associated with the MOV instruction.

TABLE 8S

GET_SOURCE(S0,t)
q.x = t.x;
q.y = t.y;
q.z = t.z;
q.w = t.w;
SET_DESTINATION(D,q)

Examples:
    MOV o[1],-R4 (move negative R4 into o[1])
    MOV R5,v[POS].w (move w component of v[POS] into xyzw components of R5)
    MOV o[HPOS],c[0] (output constant in location zero)
    MOV R7.xyw,R4.x (move x component of R4 into x,y,w components of R7)

Multiply (MUL)

Format:
    MUL[c] D[.xyzw][(CC[.xyzw])],[-][!]S0[.xyzw][!],
        [-][!]S1[.xyzw][!]

Description:
    The present instruction multiplies sources into a destination. It should be noted that 0.0 times anything is 0.0.

Operation:
    Table 8T sets forth an example of operation associated with the MUL instruction.

TABLE 8T

GET_SOURCE(S0,t)
GET_SOURCE(S1,u)
q.x = t.x*u.x;
q.y = t.y*u.y;
q.z = t.z*u.z;

TABLE 8T-continued

```
q.w = t.w*u.w;
SET_DESTINATION(D,q)
```

Examples:
MUL R6,R5,c[CON5]  R6.xyzw=R5.xyzw*c[CON5].xyzw
MUL R6.x,R5.w,-R7 R6.x=R5.w*-R7.x Move Address Register (MVA)

Format:
MVA[c] D[.xyzw][(CC[.xyzw])],S0

Description:
The present instruction increments an address register. The source may be an address register, and the destination can be an address register (A0 or A1) and/or condition code. The source can not necessarily be negated, absoluted, or swizzled. The result may be clamped in the range: −512 to +511.

Operation:
Table 8U sets forth an example of operation associated with the MVA instruction.

TABLE 8U

```
a = source0;
q.x = a.x + a.z; if (q.x < -512) q.x = -512; else
 if (q.x > 511) q.x = 511;
q.y = a.y + a.w; if (q.y < -512) q.y = -512; else
 if (q.y > 511) q.y = 511;
q.z = a.x + a.z; if (q.z < -512) q.z = -512; else
 if (q.z > 511) q.z = 511;
q.w = a.y + a.w; if (q.w < -512) q.w = -512; else
 if (q.w > 511) q.w = 511;
SET_DESTINATION(D,q)
```

Examples:
MVA A0,A1; //

Reciprocal (RCP)

Format:
RCP[c] D[.xyzw][(CC[.xyzw])],[-][|]S0.[xyzw][|]

Description:
The present instruction inverts a source scalar into a destination. The source may have one subscript. Output may be exactly 1.0 if the input is exactly 1.0.
RCP(−Inf) gives (−0.0,−0.0,−0.0,−0.0)
RCP(−0.0) gives (−Inf,−Inf,−Inf,−Inf)
RCP(+0.0) gives (+Inf,+Inf,+Inf,+Inf)
RCP(+Inf) gives (0.0,0.0,0.0,0.0)

Operation:
Table 8V sets forth an example of operation associated with the RCP instruction.

TABLE 8V

```
GET_SOURCE(S0,t)
if (t.x == 1.0)
    q.x = q.y = q.z = q.w = 1.0;
else
    q.x = q.y = q.z = q.w = 1.0/t.x; where |q.x -
IEEE(1.0/t.x)| < 1/(2**22) for all 1.0<=t.x<2.0
SET_DESTINATION(D,q)
```

Examples:
RCP R2,c[A0.x+14].x R2.xyzw=f1/c[A0.x+14].x
RCP R2.w,R3.z R2.w=1/R3.z

Reciprocal Square Root (RSQ)

Format:
RSQ[c] D[.xyzw][(CC[.xyzw])],[-][|]S0.[xyzw][|]

Description:
The present instruction performs an inverse square root of absolute value on a source scalar into a destination. The source may have one subscript. The output may be exactly 1.0 if the input is exactly 1.0.
RSQ(0.0) gives (+Inf,+Inf,+Inf,+Inf)
RSQ(Inf) gives (0.0,0.0,0.0,0.0)

Operation:
Table 8W sets forth an example of operation associated with the RSQ instruction.

TABLE 8W

```
GET_SOURCE(S0,t)
if (t.x == 1.0)
    q.x = q.y = q.z = q.w = 1.0;
else
    q.x=q.y=q.z=q.w=1.0/sqrt(abs(t.x)); with |q.x -
IEEE(1.0/sqrt(t.x))| < 1/(2**22) for 1.0<=t.x<4.0
SET_DESTINATION(D,q)
```

Examples:
RSQ o[PA0],R3.y o[PA0]=1/sqrt(abs(R3.y))
RSQ R2.w,v[9].x R2.w=1/sqrt(abs(v[9].x))

Set On Equal To (SEQ)

Format:
SEQ[c] D[.xyzw][(CC[.xyzw])],[-][|]S0[.xyzw][|],
    [-][|]S1[.xyzw][|]

Description:
The present instruction set a destination to 1.0/0.0 if source0 is equal/not_equal compared to source1.

Operation:
Table 8X sets forth an example of operation associated with the SEQ instruction.

TABLE 8X

```
GET_SOURCE(S0,t)
GET_SOURCE(S1,u)
q.x = NaN; if (t.x == u.x) q.x = 1.0; else if (t.x <> u.x) q.x =
 0.0;
q.y = NaN; if (t.y == u.y) q.y = 1.0; else if (t.y <> u.y) q.y =
 0.0;
q.z = NaN; if (t.z == u.z) q.z = 1.0; else if (t.z <> u.z) q.z =
 0.0;
q.w = NaN; if (t.w == u.w) q.w = 1.0; else if (t.w <> u.w) q.w =
 0.0;
SET_DESTINATION(D,q)
```

Examples:
SEQ R4,R3,R7; //R4.xyzw=(R3.xyzw==R7.xyzw?1.0:0.0)

Set False (SFL)

Format:
SFL[c] D[.xyzw][(CC[.xyzw])]

Description:
The present instruction set the destination to 0.0.

Operation:
Table 8Y sets forth an example of operation associated with the SFL instruction.

TABLE 8Y

```
q.y = 0.0;
q.z = 0.0;
q.w = 0.0;
SET_DESTINATION(D,q)
```

Examples:
SFL R4,R3,R7; //R4.xyzw=0.0,0.0,0.0,0.0

Set On Greater Or Equal Than (SGE)

Format:
SGE[c] D[.xyzw][(CC[.xyzw])],[-][!]S0[.xyzw][!],
[-][!]S1[.xyzw][!]

Description:
The present instruction set a destination to 1.0/0.0 if source0 is greater_or_equal/less_than source1.

Operation:
Table 8Z sets forth an example of operation associated with the SGE instruction.

TABLE 8Z

```
GET_SOURCE(S0,t)
GET_SOURCE(S1,u)
q.x = NaN; if (t.x >= u.x) q.x = 1.0; else if (t.x < u.x) q.x = 0.0;
q.y = NaN; if (t.y >= u.y) q.y = 1.0; else if (t.y < u.y) q.y = 0.0;
q.z = NaN; if (t.z >= u.z) q.z = 1.0; else if (t.z < u.z) q.z = 0.0;
q.w = NaN; if (t.w >= u.w) q.w = 1.0; else if (t.w < u.w) q.w = 0.0;
SET_DESTINATION(D,q)
```

Examples:
SGE R4,R3,R7 R4.xyzw=(R3.xyzw>=R7.xyzw?1.0:0.0)
SGE R3.xz,R6.w,R4 R3.xz=(R6.w>=R4.xyzw?1.0:0.0)

Set On Greater Than (SGT)

Format:
SGT[c] D[.xyzw][(CC[.xyzw])],[-][!]S0[.xyzw][!],
[-][!]S1[.xyzw][!]

Description:
The present instruction sets the destination to 1.0/0.0 if source0 is greater/less_or_equal compared to source1.

Operation:
Table 8AA sets forth an example of operation associated with the SGT instruction.

TABLE 8AA

```
GET_SOURCE(S0,t)
GET_SOURCE(S1,u)
q.x = NaN; if (t.x > u.x) q.x = 1.0; else if (t.x <= u.x) q.x = 0.0;
q.y = NaN; if (t.y > u.y) q.y = 1.0; else if (t.y <= u.y) q.y = 0.0;
q.z = NaN; if (t.z > u.z) q.z = 1.0; else if (t.z <= u.z) q.z = 0.0;
q.w = NaN; if (t.w > u.w) q.w = 1.0; else if (t.w <= u.w) q.w = 0.0;
SET_DESTINATION(D,q)
```

Examples:
SGT R4,R3,R7; //R4.xyzw=(R3.xyzw>R7.xyzw?1.0:0.0)

Sine (SIN)

Format:
SIN[c] D[.xyzw][(CC[.xyzw])],[-][!]S0.[xyzw][!]

Description:
The present instruction is a sine function. The source is a scalar. Input is an unbounded angle in radians.

Operation:
Table 8BB sets forth an example of operation associated with the SIN instruction.

Table 8BB

```
GET_SOURCE(S0,t)
q.x = q.y = q.z = q.w = SIN(t.x); where |ieee_sin(t.x) -
SIN(t.x)| < 1/(2**22) for 0.0 <= t.x < 2PI
SET_DESTINATION(D,q)
```

Examples:
SIN R0,R3.x;

Set On Less Than Or Equal (SLE)

Format:
SLE[c] D[.xyzw][(CC[.xyzw])],[-][!]S0[.xyzw][!],
[-][!]S1[.xyzw][!]

Description:
The present instruction sets the destination to 1.0/0.0 if source0 is less_or_equal/greater compared to source1.

Operation:
Table 8CC sets forth an example of operation associated with the SLE instruction.

TABLE 8CC

```
GET_SOURCE(S0,t)
GET_SOURCE(S1,u)
q.x = NaN; if (t.x <= u.x) q.x = 1.0; else if (t.x > u.x) q.x = 0.0;
q.y = NaN; if (t.y <= u.y) q.y = 1.0; else if (t.y > u.y) q.y = 0.0;
q.z = NaN; if (t.z <= u.z) q.z = 1.0; else if (t.z > u.z) q.z = 0.0;
q.w = NaN; if (t.w <= u.w) q.w = 1.0; else if (t.w > u.w) q.w = 0.0;
SET_DESTINATION(D,q)
```

Examples:
SLE R4,R3,R7; //R4.xyzw=(R3.xyzw<=R7.xyzw?1.0:0.0)

Set On Less Than (SLT)

Format:
SLT[c] D[.xyzw][(CC[.xyzw])],[-][!]S0[.xyzw][!],
[-][!]S1[.xyzw][!]

Description:
The present instruction sets a destination to 1.0/0.0 if source0 is less_than/greater_or_equal to source1. The following relationships should be noted:
SetEQ R0,R1=(SGE R0,R1)*(SGE-R0,-R1)
SetNE R0,R1=(SLE R0,R1)+(SLT-R0,-R1)
SetLE R0,R1=SGE-R0,-R1

SetGT R0,R1=SLT−R0,−R1

Operation:

Table 8DD sets forth an example of operation associated with the SLT instruction.

TABLE 8DD

GET_SOURCE(S0,t)
GET_SOURCE(S1,u)
q.x = NaN; if (t.x < u.x) q.x = 1.0; else if (t.x >= u.x) q.x = 0.0;
q.y = NaN; if (t.y < u.y) q.y = 1.0; else if (t.y >= u.y) q.y = = 0.0;
q.z = NaN; if (t.z < u.z) q.z = 1.0; else if (t.z >= u.z) q.z = = 0.0;
q.w = NaN; if (t.w < u.w) q.w = 1.0; else if (t.w >= u.w) q.w = 0.0;
SET_DESTINATION (D,q)

Examples:
SLT R4,R3,R7 R4.xyzw=(R3.xyzw<R7.xyzw?1.0:00)
SLT R3.xz,R6.w,R4 R3.xz=(R6.w<R4.xyzw?1.0:00)

Set On Not Equal To (SNE)

Format:
SNE[c] D[.xyzw][(CC[.xyzw])],[−][!]S0[.xyzw][!],
[−][!]S1[.xyzw][!]

Description:

The present instruction sets the destination to 1.0/0.0 if source0 is not_equal/equal compared to source1.

Operation:

Table 8EE sets forth an example of operation associated with the SNE instruction.

TABLE 8EE

GET_SOURCE(S0,t)
GET_SOURCE(S1,u)
q.x = NaN; if (t.x <> u.x) q.x = 1.0; else if (t.x == u.x) q.x = 0.0;
q.y = NaN; if (t.y <> u.y) q.y = 1.0; else if (t.y == u.y) q.y = 0.0;
q.z = NaN; if (t.z <> u.z) q.z = 1.0; else if (t.z == u.z) q.z = 0.0;
q.w = NaN; if (t.w <> u.w) q.w = 1.0; else if (t.w == u.w) q.w = 0.0;
SET_DESTINATION(D,q)

Examples:
SNE R4,R3,R7;  //R4.xyzw=(R3.xyzw!=R7.xyzw?1.0: 0.0)

Set Signum (SSG)

Format:
SSG[c] D[.xyzw][(CC[.xyzw])],[−][!]S0[.xyzw][!]

Description:

The present instruction sets the destination to −1.0/0.0/+1.0.

Operation:

Table 8FF sets forth an example of operation associated with the SSG instruction.

TABLE 8FF

GET_SOURCE(S0,t)
q.x = NaN; if (t.x < 0.0) q.x = −1.0; else if (t.x == 0.0) q.x = 0.0; else if (t.x > 0.0) q.x 1.0;

TABLE 8FF-continued q.y = NaN; if (t.y < 0.0) q.y = −1.0; else if (t.y == 0.0) q.y = 0.0; else if (t.y > 0.0) q.y = 1.0;
q.z = NaN; if (t.z < 0.0) q.z = −1.0; else if (t.z == 0.0) q.z = 0.0; else if (t.z > 0.0) q.z = 1.0;
q.w = NaN; if (t.w < 0.0) q.w = −1.0; else if (t.w == 0.0) q.w = 0.0; else if (t.w > 0.0) q.w = 1.0;
SET_DESTINATION(D,q)

Examples:
SSG R4,R3; //

Set True (STR)

Format:
STR[c] D[.xyzw][(CC[.xyzw])]

Description:

The present instruction sets the destination to 1.0.

Operation:

Table 8GG sets forth an example of operation associated with the STR instruction.

TABLE 8GG q.x = 1.0;
q.y = 1.0;
q.z = 1.0;
q.w = 1.0;
SET_DESTINATION(D,q)

Examples:
STR R4; //R4.xyzw=1.0,1.0,1.0,1.0

Floating Point Requirements

All calculations may be assumed to be IEEE single precision floating point with a format of s1e8m23, and an exponent bias of 127. No floating point exceptions or interrupts may be supported. Denorms may be flushed to zero. NaN may be treated as infinity. Negative 0.0 may be treated as positive 0.0 in all comparisons.

The following rules of Table 8HH may apply.

TABLE 8HH

| 0.0 * x = 0.0 | for all x () |
| 1.0 * x = x | for all x (including infinity and NaN) |
| 0.0 + x = x | for all x (including infinity and NaN) |

Programming Examples

A plurality of program examples will now be set forth in Table 9.

TABLE 9

The #define statements are meant for a cpp run.

Example 1
%!VS2.0
; Absolute Value R4 = abs(R0)
    MAX    R4,R0,−R0;
Example 2
%!VS2.0
; Cross Product $\begin{vmatrix} i & j & k \\ R0 \cdot x & R0 \cdot y & R0 \cdot z \\ R1 \cdot x & R1 \cdot y & R1 \cdot z \end{vmatrix}$ into R2
;
;

TABLE 9-continued

The #define statements are meant for a cpp run.

```
    MUL    R2,R0.zxyw,R1.yzxw;
    MAD    R2,R0.yzxw,R1.zxyw,-R2;
Example 3
%!VS2.0
; Determinant  |R0·x  R0·y  R0·z|  into R3
;              |R1·x  R1·y  R1·z|
;              |R2·x  R2·y  R2·z|
    MUL    R3,R1.zxyw,R2.yzxw;
    MAD    R3,R1.yzxw,R2.zxyw,-R3;
    DP3    R3,R0,R3;
Example 4
%!VS2.0
; R2 = matrix[3] [3] *v->onrm ,normalize and calculate
distance vector R3
#define INRM   11;   source normal
#define N0     16;   inverse transpose modelview row 0
#define N4     17;   inverse transpose modelview row 1
#define N8     18;   inverse transpose modelview row 2
    DP3    R2.x,v[INRM],c[N0];
    DP3    R2.y,v[INRM],c[N4];
    DP3    R2.z,v[INRM],c[N8];
    DP3    R2.w,R2,R2;
    REQ    R11.x,R2.w;
    MUL    R2.xyz,R2,R11.x;
    DET    R3,R2.w,R11.x;
Example 5
%!VS2.0
; reduce R1 to fundamental period
#define PERIOD 70;   location PERIOD is
1.0/(2*PI) ,2*PI,0.0,0.0
    MUL    R0,R1,c[PERIOD] .x;   divide by period
    FRC    R4,R0;
    MUL    R2,R4.x,c[PERIOD] .y;  multiply by period
Example 6
%!VS2.0
; matrix[4] [4] *v->opos with homogeneous divide
#define IPOS   0;   source position
#define M0    20;   modelview row 0
#define M4    21;   modelview row 1
#define M8    22;   modelview row 2
#define M12   23;   modelview row 3
    DP4    R5.w,v[IPOS] ,c[M12];
    DP4    R5.x,v[IPOS] ,c[M0];
    DP4    R5.y,v[IPOS] ,c[M4];
    DP4    R5.z,v[IPOS] ,c[M8];
    RCP    R11,R5.w;
    MUL    R5,R5,R11;
Example 7
%!VS2.0
; R4 = v->weight.x*R2 + (1.0-v->weight.x)*R3
#define IWGT   11;   source weight
    ADD    R4,R2,-R3;
    MAD    R4,v[IWGT].x,R4,R3;
Example 8
%!VS2.0
; signum function R6 = R3.x>0? 1, R3.x==0? 0, R3.x<0? -1
; c[0] = (0.0,1.0,NA,NA)
    MOVc   CC,R3.x;
    SGT    R6,R3.x,c[0] .x;
    MOV    R6(LT), -c[0] .y;
Example 9
%!S2.0
; subroutine call to index v[TEX3] .x if v[TEX3] .y > 0.0
    MOVc   CC.y,v[TEX3] .y;
    ARL    A0.w,v[TEX3] .x;
    CAL    GT.y,A0.w;
```

As mentioned earlier, various functions such as sine and cosine may be executed by the previous embodiment. In particular, such mathematical functions are directly performed on the input data. It should be noted that the mathematical function is directly performed in the computer graphics pipeline without a texture look-up or significant or any aid from a central processing unit. More information will now be set forth regarding the manner in which one embodiment is capable of directly executing such functions in a computer graphics pipeline such as that of FIG. 1.

Figure 6:
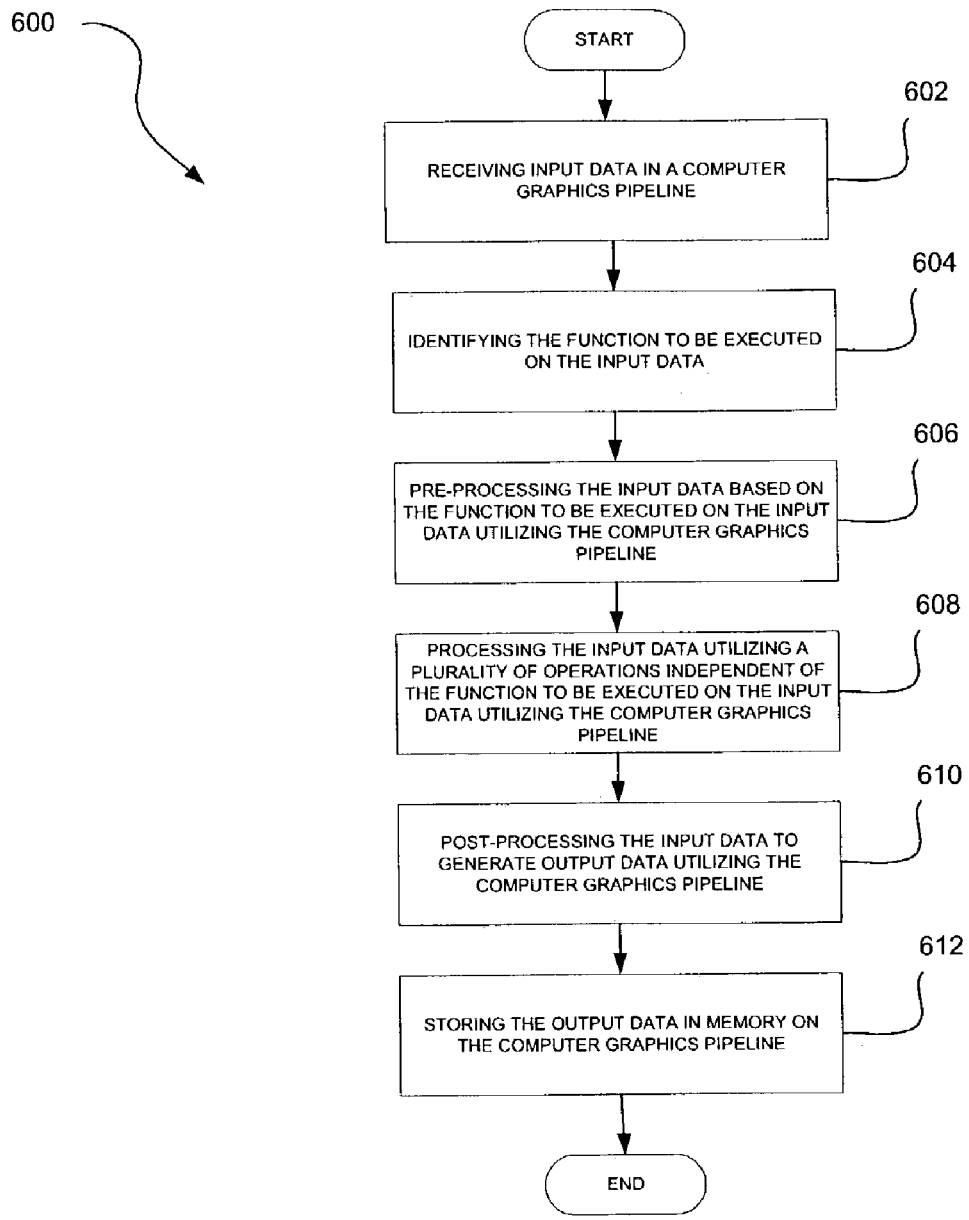
FIG. 6 illustrates a method for directly executing a function in a computer graphics pipeline.

FIG. 6 illustrates a method 600 for directly executing a function in a computer graphics pipeline. While the present method 600 may be carried in the context of the computer graphics pipeline of FIG. 1 and more particularly the functional module 302 of FIG. 3, it should be noted that any other type of dedicated graphics pipeline-application specific integrated circuit (ASIC) may be utilized per the desires of the user. Moreover, the method 600 need not be limited to a graphics pipeline. It can work just as well outside of the context of graphics.)

Initially, in operation 602, input data is received in a computer graphics pipeline. Such input data may include vertex data or any other data capable of being handled by the computer graphics pipeline.

Next, in operation 604, the particular function to be executed on the input data is identified. In one embodiment, the mathematical function may include a sine, cosine, or various other functions including, but not be limited to tangent, arctangent, exponentiation, logarithm, hyperbolic sine, hyperbolic cosine, hyperbolic tangent, and/or hyperbolic arctangent. Moreover, the input data may be in a floating-point format. It should be noted that the sin(x) and cos(x) functions may include an argument x that is in either degrees or radians.

Thus, in operation 606, pre-processing of the input data may be carried out based on the function to be executed on the input data utilizing the computer graphics pipeline. The purpose of the pre-processing is to convert the input data into a form that may be handled by general processing hardware that is used later, regardless of the specific function to be utilized. More information regarding the pre-processing of operation 606 will be set forth in greater detail during reference to FIG. 7.

Thereafter, in operation 608, the input data may be processed utilizing a plurality of operations independent of the function to be executed on the input data utilizing the computer graphics pipeline. As an option, the mathematical function may be performed utilizing a Taylor Series, a cordic algorithm, or any other type of algorithm. Still yet, the input data may be converted from a first coordinate system to a second coordinate system (e.g., Cartesian, cylindrical, spherical, etc.). Further, the mathematical function may be carried out in one cycle in the computer graphics pipeline. More information regarding the processing of operation 608 will be set forth in greater detail during reference to FIG. 8.

Subsequently, in operation 610, post-processing may be carried out on the input data to generate output data utilizing the computer graphics pipeline. The purpose of the post-processing is to convert the general output of the general processing hardware to a form that may be handled by subsequent processes. More information regarding the post-processing of operation 610 will be set forth in greater detail during reference to FIG. 9.

Finally, such output data may be stored in memory on the computer graphics pipeline. Note operation 612. Of course, such memory may include, but is not limited to any type of buffer memory or the like for storing the output for later use.

It should be noted that the mathematical function is directly performed in the computer graphics pipeline. In other words, the pre-processing of operation 606, the processing of operation 608, and the post-processing of operation 610 are performed by the computer graphics pipeline, without a texture look-up or significant or any aid from a central processing unit.

Figure 7:
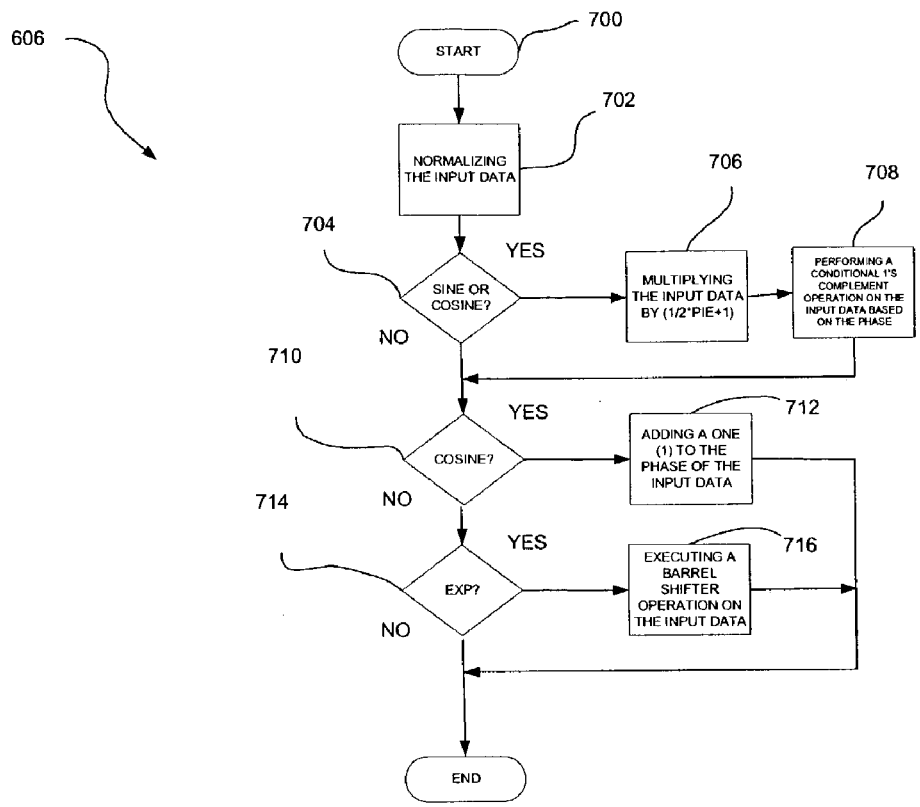
FIG. 7 illustrates a method for pre-processing input data, in accordance with the process of FIG. 6.

FIG. 7 illustrates a method 700 for pre-processing input data, in accordance with operation 606 of FIG. 6. While specific pre-processing is set forth herein, it should be noted that the pre-processing may include any operations capable of converting the input data into a form that may be handled by general processing hardware that is used in operation 608.

As shown, the input data is initially normalized in operation 702. As an option, such normalization includes altering the input data by a scaling bias. Next, various pre-processing is carried out based on the type of function that is to be executed.

In particular, it is determined in decision 704 whether the function is sine or cosine. If so, the pre-processing includes multiplying the input data by $(1/(2\pi)+1.0)$. See operation 706. This ensures that the range of input data of $[0.0, 2.0\pi)$ is mapped to a range of $[1.0, 2.0)$. If the input data resides outside of the range of $[0.0, 2.0\pi)$, the integer portion of the input data may be ignored. As an option, the sign of the input data may be manipulated to position the input data in the appropriate quadrant. It should be understood that operation 706 may be executed with a precision high enough to permit an indication of the appropriate quadrant of the input data while retaining intra-quadrant accuracy.

Moreover, the pre-processing includes performing a conditional 1's complement operation on the input data. Note operation 708. In particular, the conditional 1's complement operation is conditioned on quadrant of the input. The purpose of such pre-processing is to exploit the symmetry of the sine and cosine functions and thus transform the general problem to that of always evaluating the function within a single quadrant.

It is then determined in decision 710 whether the function to be executed is a cosine. If so, the pre-processing includes adding a one (1) to the quadrant of the input data in operation 712. The purpose of such pre-processing is to alter the quadrant of the input data so that it may be processed as if it were the subject of a sine function. Such operation as that of 712 is an optimization in the preferred embodiment.

Next, it is determined in decision 714 whether the function to be executed is exponentiation. If the function includes exponentiation, a barrel shift operation is performed on the input data. See operation 716. The purpose of such pre-processing is to denormalize the input into an integer and fractional portion, the fractional portion then serving as input to 608.

Figure 8:
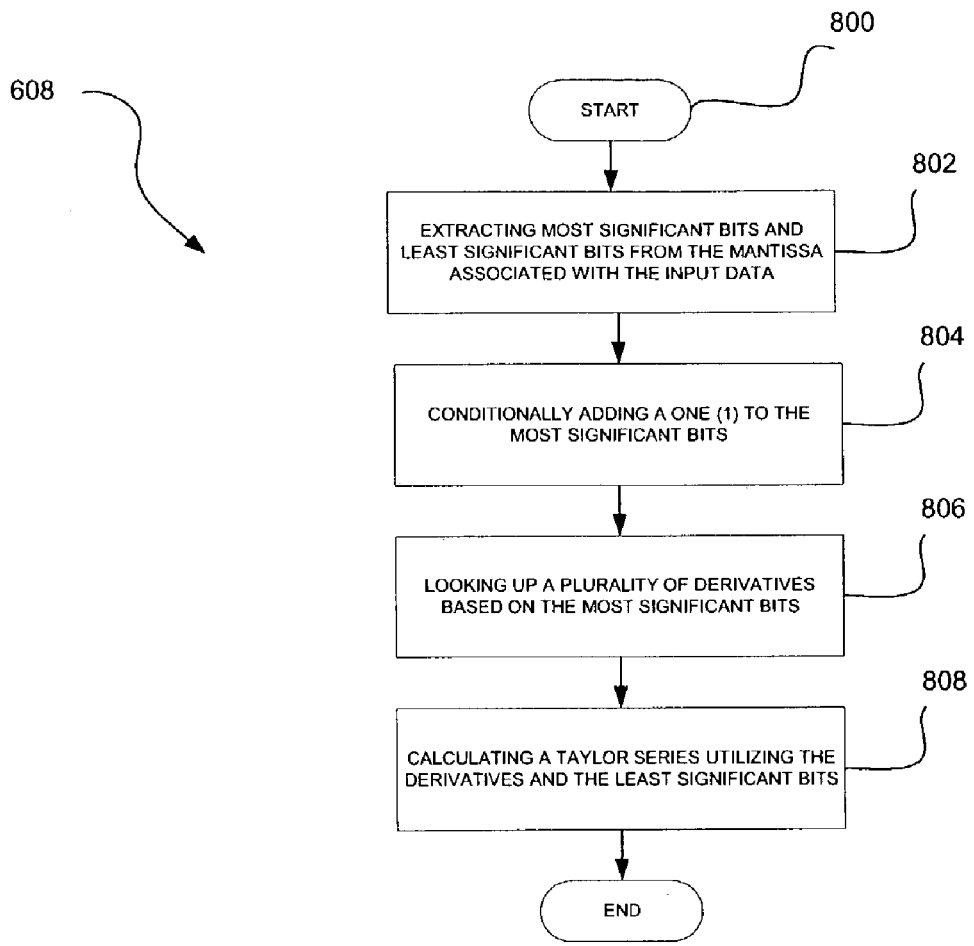
FIG. 8 illustrates a method for processing input data, in accordance with the process of FIG. 6.

FIG. 8 illustrates a method 800 for processing input data, in accordance with operation 608 of FIG. 6. While specific processing is set forth herein, it should be noted that the processing may include any algorithm capable of executing the function in accordance with operation 608.

Initially, in operation 802, the processing may include extracting a set of most significant bits (msbs) and a set of least significant bits (lsbs) from a mantissa associated with the input data. It should be noted that the mantissa may be extracted as a component of the input data along with a sign and an exponent thereof. In one embodiment, the set of most significant bits may include a 6-bit set. Further, the set of least significant bits may include a 17-bit set. It should be noted that the number of least and most significant bits determines an accuracy of the output data, and further has ramifications in the contents of the tables.

Further, in operation 804, the processing may include conditionally adding a one (1) to the most significant bits. In particular, the addition operation is conditioned on the msb of the lsb set. In the embodiment of the previous paragraph, the corresponds to the msb of the 17-bit lsb set. The purpose of the addition operation is to best utilize the table entries by always accessing the table entry closest (absolute value) to the exact desired sample location.

As mentioned earlier, the processing may include calculating a Taylor Series. To accomplish this calculation, information is looked up in a plurality of tables in operation 806 corresponding to the most significant bits extracted in operation 802 as processed by 804 Such retrieved information may include a first n (n=0, 1, 2) derivatives corresponding to the most significant bits. As an option, the look-up operation may be based at least in part on the least significant bits in order to locate a closest table entry. In the alternative, larger tables may be utilized.

The first n (i.e. n=2) derivatives may then be summed in the Taylor Series utilizing the least significant bits extracted in operation 802, the calculation of which is conventionally known. Table GG illustrates the various derivatives, least significant bits, and the equation by which the Taylor Series is calculated. It should be noted that the sign extracted in operation 802 may also be used during the following calculations.

TABLE GG $f_0 = f(x)$
$f_1 = f'(x)$
$f_2 = f''(x)$
$h = lsbs$
$sum = f_0 + h/1!* f_1 + h^2/2!* f_2 + h^2/2!* f_2$ As an option, the tables may be utilized based on the function to be executed on the input data. Moreover, the tables may be hard-coded or stored in random access memory for programming purposes. Still yet, the tables may be loaded at runtime.

It should be noted that the operations 802–808 entail the same functionality carried out by the same dedicated hardware, regardless of the function being carried out. Such dedicated hardware outputs the sign, the exponent, and the sum for post-processing in operation 610 of FIG. 6.

Figure 9:
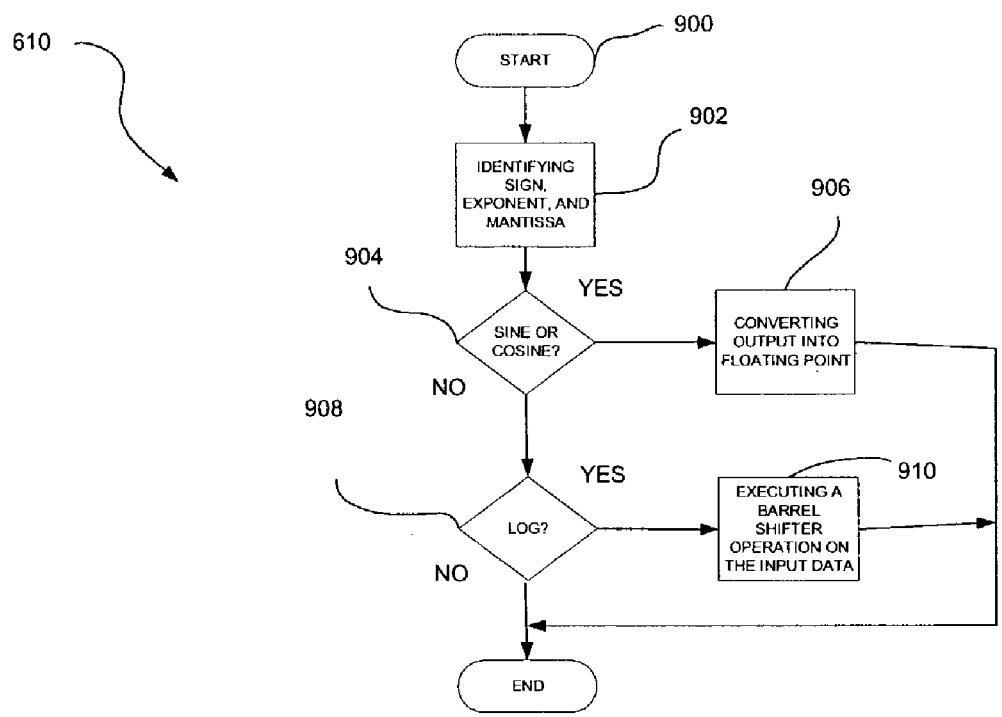
FIG. 9 illustrates a method for post-processing input data, in accordance with the process of FIG. 6.

FIG. 9 illustrates a method 900 for post-processing input data, in accordance with operation 610 of FIG. 6. While specific post-processing is set forth herein, it should be noted that the post-processing may include anything necessary to prepare the processed input data for output in accordance with operation 610, based on the specific function executed in operation 608.

Specifically, the sign, the exponent and the sum may be received from the method 800 of FIG. 8 for output as the sign, exponent and the mantissa, respectively. Note operation 902. It may further be determined if the presently executed function is either sine or cosine in decision 904. If so, the sign, exponent and the mantissa may be converted into a floating point format in operation 906. Further, in decision 908, it may be determined if the presently executed function is a logarithm. If so, a barrel shifter operation may be performed similar to operation 716 of FIG. 7.

The essence of post-processing 610 in the embodiment is the conversion of fixed-point fractional data, as received from 608 into a floating-point format for storage in 612. (Additional responsibilities of 610 are the detection of special cases, e.g., $\sin(\pm inf) \rightarrow NaN$, $\log(x)$, $x<0 \rightarrow -inf$, $\sin(x)$, $x \approx 0 \rightarrow x$, etc.)

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for branching during graphics processing, comprising:
    performing a first operation on data; and
    in response to the first operation, branching to a second operation;
    wherein the first operation and the second operation are associated with instructions selected from a predetermined instruction set;
    wherein the branching to the second operation is performed based on a Boolean condition;
    wherein the branching to the second operation is performed if content of a predetermined register is true;
    wherein the branching involves a swizzle operation;
    wherein the first operation and the second operation are selected from a group consisting of a branch operation, a call operation, a fraction operation, a no operation, a move operation, a multiply operation, an addition operation, a multiply and addition operation, a reciprocal operation, a reciprocal square root operation, a three component dot product operation, a four component dot product operation, a distance operation, a minimum operation, a maximum operation, an exponential operation, a logarithm operation, and a lighting operation.

2. The method as recited in claim 1, wherein the branching to the second operation is performed based on a comparison.

3. The method as recited in claim 2, wherein the comparison includes a greater than operation.

4. The method as recited in claim 2, wherein the comparison includes a less than operation.

5. The method as recited in claim 2, wherein the comparison includes a greater than or equal operation.

6. The method as recited in claim 2, wherein the comparison includes a less than or equal operation.

7. The method as recited in claim 2, wherein the comparison includes an equal operation.

8. The method as recited in claim 2, wherein the comparison includes a not equal operation.

9. The method as recited in claim 1, wherein the branching to the second operation is performed based on a comparison involving zero.

10. The method as recited in claim 1, wherein the branching is performed to a label.

11. The method as recited in claim 1, and further comprising performing the swizzling operation on the data.

12. The method as recited in claim 11, wherein the swizzling operation involves vector components.

13. The method as recited in claim 12, wherein the swizzling operation involves condition codes.

14. A system for branching during graphics processing, comprising:
    means for performing a first operation on data, and
    means for branching to a second operation, in response to the first operation;
    wherein the first operation and the second operation are associated with instructions selected from a predetermined instruction set;
    wherein the branching to the second operation is performed based on a Boolean condition;
    wherein the branching to the second operation is performed if content of a predetermined register is true;
    wherein the branching involves a swizzle operation;
    wherein the first operation and the second operation are selected from a group consisting of a branch operation, a call operation, a fraction operation, a no operation, a move operation, a multiply operation, an addition operation, a multiply and addition operation, a reciprocal operation, a reciprocal square root operation, a three component dot product operation, a four component dot product operation, a distance operation, a minimum operation, a maximum operation, an exponential operation, a logarithm operation, and a lighting operation.

15. A computer program product for branching during graphics processing, comprising:
    computer code for performing a first operation on data; and
    computer code for branching to a second operation in response to the first operation;
    wherein the first operation and the second operation are associated with instructions selected from a predetermined instruction set;
    wherein the branching to the second operation is performed based on a Boolean condition;
    wherein the branching to the second operation is performed if content of a predetermined register is true;
    wherein the branching involves a swizzle operation;
    wherein the first operation and the second operation are selected from a group consisting of a branch operation, a call operation, a fraction operation, a no operation, a move operation, a multiply operation, an addition operation, a multiply and addition operation, a reciprocal operation, a reciprocal square root operation, a three component dot product operation, a four component dot product operation, a distance operation, a minimum operation, a maximum operation, an exponential operation, a logarithm operation, and a lighting operation.

16. An application program interface data structure for branching during graphics processing, comprising:
    an instruction set for performing a first operation on data, and in response to the first operation, branching to a second operation;
    wherein the branching to the second operation is performed based on a Boolean condition;
    wherein the branching to the second operation is performed if content of a predetermined register is true;
    wherein the branching involves a swizzle operation;
    wherein the instruction set includes operations selected from a group consisting of a fraction operation, a no operation, a move operation, a multiply operation, an addition operation, a multiply and addition operation, a reciprocal operation, a reciprocal square root operation, a three component dot product operation, a four component dot product operation, a distance operation, a minimum operation, a maximum operation, an exponential operation, a logarithm operation, and a lighting operation.

17. A system for branching during graphics processing, comprising:
    a functional module adapted for performing a first operation on data, and branching to a second operation;
    wherein the first operation and the second operation are associated with instructions selected from a predetermined instruction set;
    wherein the branching to the second operation is performed based on a Boolean condition;
    wherein the branching to the second operation is performed if content of a predetermined register is true;

wherein the branching involves a swizzle operation;

wherein the predetermined instruction set includes a fraction operation, a no operation, a move operation, a multiply operation, an addition operation, a multiply and addition operation, a reciprocal operation, a reciprocal square root operation, a three component dot product operation, a four component dot product operation, a distance operation, a minimum operation, a maximum operation, an exponential operation, a logarithm operation, and a lighting operation.

18. A method for branching during graphics processing, comprising:

performing a first operation on data; and in response to the first operation, branching to a second operation;

wherein the first operation and the second operation are associated with instructions selected from a predetermined instruction set;

wherein the branching to the second operation is performed based on a Boolean condition;

wherein at least one of the first operation and the second operation includes an operation selected from a group consisting of a branch operation, a call operation, a fraction operation, a no operation, a move operation, a multiply operation, an addition operation, a multiply and addition operation, a reciprocal operation, a reciprocal square root operation, a three component dot product operation, a four component dot product operation, a distance operation, a minimum operation, a maximum operation, an exponential operation, a logarithm operation, and a lighting operation.

19. A method for branching during graphics processing, comprising:

performing a first operation on data; and in response to the first operation, branching to a second operation;

wherein the first operation and the second operation are associated with instructions selected from a predetermined instruction set;

wherein the branching to the second operation is performed if content of a predetermined register is true;

wherein the first operation and the second operation am selected from a group consisting of a branch operation, a call operation, a fraction operation, a no operation, a move operation, a multiply operation, an addition operation, a multiply and addition operation, a reciprocal operation, a reciprocal square root operation, a three component dot product operation, a four component dot product operation, a distance operation, a minimum operation, a maximum operation, an exponential operation, a logarithm operation, and a lighting operation.

20. A method for branching during graphics processing, comprising:

performing a first operation on data; and in response to the first operation, branching to a second operation;

wherein the first operation and the second operation are associated with instructions selected from a predetermined instruction set;

wherein the branching involves a swizzle operation;

wherein at least one of the first operation and the second operation includes at least one of a fraction operation, a no operation, a move operation, a multiply operation, an addition operation, a multiply and addition operation, a reciprocal operation, a reciprocal square root operation, a three component dot product operation, a four component dot product operation, a distance operation, a minimum operation, a maximum operation, an exponential operation, a logarithm operation, and a lighting operation.

21. A method for branching during graphics processing, comprising:

performing a first operation on data; and in response to the first operation, branching to a second operation;

wherein the first operation and the second operation are associated with instructions selected from a predetermined instruction set;

wherein the branching to the second operation is performed based on a Boolean condition;

wherein the branching to the second operation is performed based on a comparison;

wherein the comparison includes a greater than operation, a less than operation, a greater than or equal operation, a less than or equal operation, an equal operation, and a not equal operation;

wherein the branching is performed to a label;

wherein the branching to the second operation is performed if content of a predetermined register is true;

wherein the branching to the second operation is performed based on a comparison involving zero;

wherein the branching involves a swizzle operation;

wherein the predetermined instruction set includes a fraction instruction, a no instruction, a move instruction, a multiply instruction, an addition instruction, a multiply and addition instruction, a reciprocal instruction, a reciprocal square root instruction, a three component dot product instruction, a four component dot product instruction, a distance instruction, a minimum instruction, a maximum instruction, an exponential instruction, a logarithm instruction, and a lighting instruction;

wherein the swizzling operation is performed on the data;

wherein the swizzling operation involves vector components.

* * * * *

UNITED STATES PATENT AND TRADEMARK OFFICE
CERTIFICATE OF CORRECTION

PATENT NO. : 7,002,588 B1  
APPLICATION NO. : 10/391930  
DATED : February 21, 2006  
INVENTOR(S) : Lindholm et al.

Page 1 of 1

It is certified that error appears in the above-identified patent and that said Letters Patent is hereby corrected as shown below:

In the claims:
Col. 33, line 42, please replace "am" with --are--.

Signed and Sealed this
Twenty-sixth Day of February, 2013

Teresa Stanek Rea
*Acting Director of the United States Patent and Trademark Office*